US012157146B2

(12) United States Patent
Kolay et al.

(10) Patent No.: US 12,157,146 B2
(45) Date of Patent: Dec. 3, 2024

(54) SORTATION DEVICES AND SYSTEMS

(71) Applicant: INTELLIGRATED HEADQUARTERS, LLC, Mason, OH (US)

(72) Inventors: Abhishek Kolay, Charlotte, NC (US); Ravi Kumar Avupati, Charlotte, NC (US); Saravanan Sadasivan, Charlotte, NC (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 17/934,807

(22) Filed: Sep. 23, 2022

(65) Prior Publication Data

US 2023/0114850 A1 Apr. 13, 2023

(30) Foreign Application Priority Data

Oct. 8, 2021 (IN) ............................. 202111045985

(51) Int. Cl.
*B07C 3/02* (2006.01)
*B07C 3/00* (2006.01)
*B07C 3/08* (2006.01)
*B07C 5/36* (2006.01)

(52) U.S. Cl.
CPC ................ *B07C 3/02* (2013.01); *B07C 3/008* (2013.01)

(58) Field of Classification Search
CPC .......... B07C 3/08; B65G 47/38; B65G 47/96; B65G 47/967
USPC .................................................. 209/698, 707
See application file for complete search history.

(56) References Cited

U.S. PATENT DOCUMENTS 6,571,937 B1 * 6/2003 Costanzo ............... B65G 17/32 198/779
10,000,346 B2 * 6/2018 Berdelle-Hilge .... B65G 47/965

FOREIGN PATENT DOCUMENTS

DE 102013202950 A1 8/2014

OTHER PUBLICATIONS

EP Office Action for Application No. 22195995.0 dated Feb. 1, 2023 (5 pages).
European search report Mailed on Aug. 11, 2023 for EP Application No. 22195995, 9 page(s).

* cited by examiner

*Primary Examiner* — Michael McCullough
*Assistant Examiner* — Molly K Devine
(74) *Attorney, Agent, or Firm* — Alston & Bird LLP

(57) ABSTRACT

Devices and systems are provided for improved article sortation. An example sortation device includes a frame and a sortation table movably attached to the frame. The sortation table defines a first end, a second end opposite the first end, and a body extending therebetween. The second end pivotally attaches the sortation table to the frame, and the body defines a first surface configured to support an article thereon. The sortation device performs a tilt operation in which the sortation table rotates about the pivotal attachment between the second end and the frame in a first direction. The sortation device also performs a bomb bay operation in which the sortation table rotates about the pivotal attachment between the second end and the frame in a second direction opposite the first direction. An example sortation system is provided that includes two or more of the example sortation devices.

15 Claims, 14 Drawing Sheets

SORTATION DEVICES AND SYSTEMS

CROSS-REFERENCE TO RELATED APPLICATIONS

This application claims priority pursuant to 35 U.S.C. 119(a) to Indian Patent Application No. 202111045985, filed Oct. 8, 2021, which application is incorporated herein by reference in its entirety.

TECHNOLOGICAL FIELD

Example embodiments of the present disclosure relate generally to fulfillment and conveyor systems and, more particularly, to devices and systems for improved article sortation.

BACKGROUND

Warehouses, distribution centers, and other material handling environments often rely on a number of components, systems, and the like for transporting and sorting articles, items, products, etc. within these environments. In some instances, one or more conveyors, conveyor segments, chutes, induction systems, system merges, and/or the like are used in order to sort or otherwise position articles within the material handling environments. The inventors have identified numerous deficiencies with these existing technologies in the field, the remedies for which are the subject of the embodiments described herein.

BRIEF SUMMARY

Devices and systems are provided for improved article sortation. An example sortation device may include a frame and a sortation table movably attached to the frame. The sortation table may define a first end, a second end opposite the first end, and a body extending therebetween. The second end may be configured to pivotally attach the sortation table to the frame, and the body may define a first surface configured to support an article thereon. The sortation device may be configured to perform a tilt operation in which the sortation table rotates about the pivotal attachment between the second end and the frame in a first direction. The sortation device may also be configured to perform a bomb bay operation in which the sortation table rotates about the pivotal attachment between the second end and the frame in a second direction opposite the first direction.

In some embodiments, rotation of the sortation table about the pivotal attachment between the second end and the frame in the first direction is such that an angle between the frame and the sortation table increases.

In some embodiments, rotation of the sortation table about the pivotal attachment between the second end and the frame in the second direction is such that an angle between the frame and the sortation table decreases.

In some embodiments, the sortation device may further include a rotation mechanism operably coupled with the sortation table and configured to cause rotation of the sortation table about the second end so as to perform the tilt operation and/or the bomb bay operation.

In some embodiments, the sortation device may further include a retraction mechanism operably coupled with the sortation table and the frame. The retraction mechanism may be configured to cause rotation of the sortation table about the second end to position the sortation table at a rest position. The sortation table may be positioned substantially perpendicular with respect to the frame at the rest position.

In some embodiments, the sortation device may further include one or more rollers supported by the body of the sortation table. The one or more rollers may be configured to translate the article relative the first surface of the body.

In some further embodiments, the one or more rollers may be configured to move between retracted position in which the one or more rollers are stored within the body of the sortation table and an extended position wherein at least a portion of the one or more rollers extends beyond the first surface of the body so as to contact the article supported thereon.

In some embodiments, the sortation device may further include one or more conveyors coupled with the first surface of the body. The one or more conveyors may be positioned substantially perpendicular to an axis extending between the first end and the second end.

In some embodiments, the frame may be configured to be operably coupled with a first chute proximate the frame and the second end of the sortation table so as to receive the article from the sortation table via the tilt operation.

In some embodiments, the frame may be configured to be operably coupled with a second chute proximate the frame and the first end of the sortation table so as to receive the article from the sortation table via the bomb bay operation.

An example sortation system for improved article sortation is also provided. The example sortation system may include a first sortation device and a second sortation device. The first sortation device may include a first frame and a first sortation table movably attached to the first frame. The first sortation table may define a first end, a second end opposite the first end, and a body extending therebetween. The second end may be configured to pivotally attach the first sortation table to the first frame, and the body may define a first surface configured to support a first article thereon. The first sortation device may be configured to perform a first tilt operation in which the first sortation table rotates about the pivotal attachment between the second end and the first frame in a first direction. The first sortation device may also be configured to perform a first bomb bay operation in which the first sortation table rotates about the pivotal attachment between the second end and the first frame in a second direction opposite the first direction. The second sortation device may include a second frame and a second sortation table movably attached to the second frame. The second sortation table may define a first end, a second end opposite the first end, and a body extending between. The second end may be configured to pivotally attach the second sortation table to the second frame, and the body may define a second surface configured to support the first article and/or a second article thereon. The second sortation device may be configured to perform a second tilt operation in which the second sortation table rotates about the pivotal attachment between the second end and the second frame in the second direction. The second sortation device may be configured to perform second bomb bay operation in which the second sortation table rotates about the pivotal attachment between the second end and the second frame in the first direction opposite the second direction.

In some embodiments, the rotation of the first sortation table about the pivotal attachment between the second end and the first frame in the first direction and the rotation of the second sortation table about the pivotal attachment between the second end and the second frame in the second direction may be such that an angle between the first frame and the first sortation table and an angle between the second frame and the second sortation table increases.

In some embodiments, rotation of the first sortation table about the pivotal attachment between the second end and the first frame in the second direction and the rotation of the second sortation table about the pivotal attachment between the second end and the second frame in the first direction may be such that an angle between the first frame and the first sortation table and an angle between the second frame and the second sortation table decreases.

In some embodiments, the sortation system may further include a first rotation mechanism operably coupled with the first sortation table and configured to cause rotation of the first sortation table about the second end so as to perform the first tilt operation and/or the first bomb bay operation. In such an embodiment, the sortation system may further include a second rotation mechanism operably coupled with the second sortation table and configured to cause rotation of the second sortation table about the second end so as to perform the second tilt operation and/or the second bomb bay operation.

In some embodiments, the sortation system may further include one or more first rollers supported by the body of the first sortation table. The one or more first rollers may be configured to translate the first article relative the first surface of the body. In such an embodiment, the sortation system may further include one or more second rollers supported by the body of the second sortation table. The one or more second rollers may be configured to translate the first article and/or the second article relative the second surface of the body.

In some embodiments, the first frame may be configured to be operably coupled with a first chute proximate the first frame and the second end of the first sortation table so as to receive the first article and/or the second article from the first sortation table via the first tilt operation In some embodiments, the second frame is configured to be operably coupled with a third chute proximate the second frame and the second end of the second sortation table so as to receive the first article and/or the second article from the second sortation table via the second tilt operation.

In some embodiments, the first frame and the second frame may be configured to be operably coupled with a second chute proximate the first frame and the first end of the first sortation table and proximate the second frame and the first end of the second sortation table so as to receive the first article and/or the second article from the first sortation table and/or the second sortation table via the first bomb bay operation and/or the second bomb bay operation.

Another example sortation system for improved article sortation is also provided. The example sortation system may include a frame, a first sortation table, and a second sortation table. The first sortation table may define a first end, a second end opposite the first end, and a body extending therebetween. The first end may be configured to pivotally attach the first sortation table to a first location of the frame, and the body defining a first surface configured to support a first article thereon. The first sortation device may be configured to perform a first tilt operation in which the first sortation table rotates about the pivotal attachment between the first end and the first location of the frame in a second direction. The first sortation device may be configured to perform a first bomb bay operation in which the first sortation table rotates about the pivotal attachment between the first end and the first location of the frame in a first direction opposite the second direction. The second sortation table may define a first end, a second end opposite the first end, and a body extending therebetween. The first end may be configured to pivotally attach the second sortation table to the first location of the frame, and the body may define a second surface configured to support the first article and/or a second article thereon. The second sortation device may be configured to perform a second tilt operation in which the second sortation table rotates about the pivotal attachment between the first end and the first location of the frame in the first direction. The second sortation device may be configured to perform a second bomb bay operation in which the second sortation table rotates about the pivotal attachment between the second end and the first location of the frame in the second direction.

In some embodiments, rotation of the first sortation table about the pivotal attachment between the first end and the frame in the first direction and the rotation of the second sortation table about the pivotal attachment between the first end and the frame in the second direction may be such that an angle between the frame and the first sortation table and an angle between the frame and the second sortation table decreases.

In some embodiments, the such a sortation system may further include one or more first rollers supported by the body of the first sortation table. The one or more first rollers may be configured to translate the first article relative the first surface of the body. Such a sortation system may further include one or more second rollers supported by the body of the second sortation table. The one or more second rollers may be configured to translate the first article and/or the second article relative the second surface of the body.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
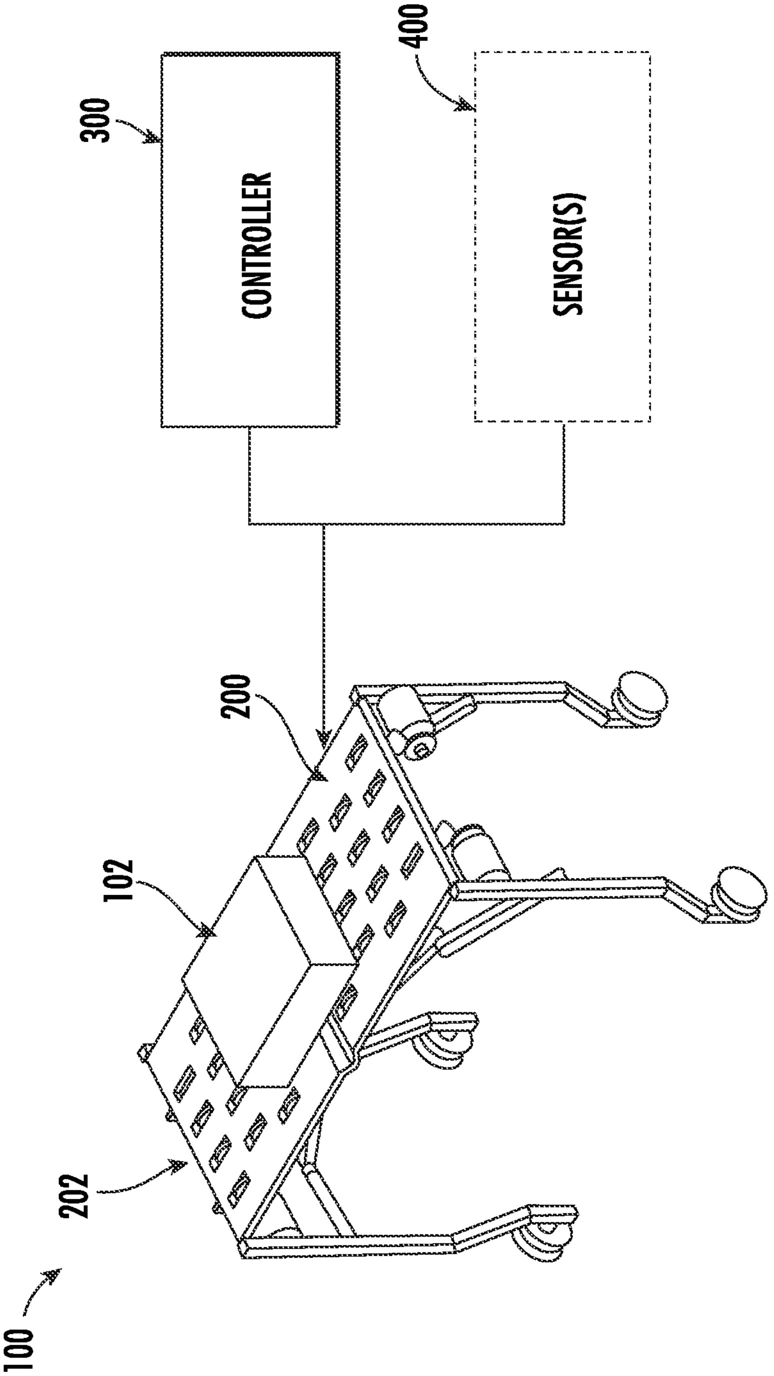
FIG. 1 illustrates an example sortation system of the present disclosure in accordance with some example embodiments described herein.

Some embodiments of the present disclosure will now be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first device is described herein to receive data from a second device, it will be appreciated that the data may be received directly from the second device or may be received indirectly via one or more intermediary computing devices, such as, for example, one or more servers, relays, routers, network access points, base stations, hosts, and/or the like, sometimes referred to herein as a "network." Similarly, where a first device is described herein as sending data to a second device, it will be appreciated that the data may be sent directly to the second device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "computer-readable medium" refers to non-transitory storage hardware, non-transitory storage device or non-transitory computer system memory that may be accessed by a computing device, a microcomputing device, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

As described hereinafter, movement of one or more elements of the example sortation systems of the present disclosure may be described with reference to a "first direction," "second direction," and/or the like. For the sake of clarity of description, the embodiments of the present disclosure describe a first direction that refers to a counter-clockwise rotational movement of, for example, a sortation table about a frame. Similarly, the embodiments of the present disclosure describe a second direction that refers to a clockwise rotational movement of, for example, a sortation table about a frame. In other words, the first direction and the second direction refer to the rotational direction of the described element as viewed in the illustrated figures. As would be evident to one of ordinary skill in the art in light of the present disclosure, the rotational direction (e.g., the first direction and/or the second direction) may vary based upon the frame of reference of the example sortation system and devices. The present disclosure, however, contemplates that the described first direction and second direction may encompass any rotational direction required to complete the intended operation of the element described in conjunction with the respective direction.

Overview

As noted above, traditional warehouses and distribution centers may rely upon a collection of connected conveyors to transport containers throughout these material handling environments. In some instances, these conveyors may be configured to sort or direct products from one conveyor to another. Furthermore, these conveyor systems may integrate induction devices, system merges, sortation diverts, and/or the like in order to ensure that articles (e.g., containers, packages, etc.) are properly sorted and that orders are ultimately fulfilled. In conventional systems, however, each type of sortation operation is completed by an individual or distinct device or system. By way of example, in order to transfer an article between adjacent conveyors a tilt tray that is specifically designed for the particular direction of transfer is required (e.g., in order to transfer an article to another direction, another distinct tilt tray is required). As such, these conventional systems require a plurality of interconnected transfer or sortation devices in order to accomplish the various sortation operations of a particular system thereby increasing the size of the overall system while simultaneously reducing throughput.

To solve these issues and others, example implementations of embodiments of the present disclosure may provide an integrated, multi-directional sortation device configured to transfer articles to a plurality of locations with a single device. Unlike the rigidity provided by conventional systems, embodiments described herein may include two or more sortation devices that may each be configured to independently perform tilt operations and bomb bay operations. Furthermore, the embodiments described herein may employ one or more rollers (e.g., pop-up rollers or the like) to provide further transfer capabilities by repositioning articles supported by the sortation devices. The embodiments described herein may not only operate as a standalone improvement (e.g., a new sortation system independently moveable relative a conveyor system) but may further operate as an improvement to existing conveyor systems (e.g., a retrofit design that improves current implementations). In doing so, such example embodiments operate to provide an integrated, multi-directional sortation device and system that reliably increase the throughput of conveyor networks and fulfillment environments resulting in improved system efficiencies.

Sortation Devices and System

With reference to FIG. 1, an example sortation system 100 (e.g., system 100) of the present disclosure is illustrated. As shown, the system 100 may include a first sortation device 202 and a second sortation device 200 that may, alone or collectively, operate to transfer or otherwise sort an article 102. The embodiments of the present disclosure are described hereafter with reference to a sortation system, such as sortation system 100, in which a plurality of sortation devices (e.g., first sortation device 202 and second sortation device 200) are used. The present disclosure, however, contemplates that the sortation system 100 may include any number of sortation devices, such as devices 200, 202 described hereafter, based upon the intended application of the system 100. Alternatively, in some embodiments, a single sortation device, such as device 200, 202, may be used. Said differently, the present disclosure contemplates that the sortation devices described herein also provide independent multi-directional sortation not found in conventional solutions (e.g., as a standalone sortation device and in conjunction with other sortation devices so as to form a sortation system).

Any of the sortation devices and sortation systems of the present disclosure, such as system 100 of FIG. 1, may include a controller 300 operably connected with one or more elements of the system 100. As described hereafter, the sortation system 100 may include various adjustable components (e.g., a rotation mechanism, a retraction mechanism, one or more rollers, etc.) that may be controlled at least in part by the controller 300. As such, the controller 300 may include circuitry, networked processors, or the like configured to perform some, or all of the sortation-based processes described herein and may be any suitable processing device and/or network server. In this regard, the controller 300 may be embodied by any of a variety of devices. For example, the controller 300 may be configured to receive/transmit data (e.g., positional data, sensor data, etc.) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, Internet of Things (IoT) device, or in some embodiments, a peripheral device that connects to one or more fixed or mobile terminals. The controller 300 may, in some embodiments, comprise several servers or computing devices performing interconnected and/or distributed functions. Despite the many arrangements contemplated herein, the controller 300 is shown and described herein as a single computing device to avoid unnecessarily overcomplicating the disclosure.

In some instances, the controller 300 may be operably coupled the sortation system 100, the first sortation device 202, and/or the second sortation device 200 via a network. By way of example, the controller 300 may be associated with a central management system or central computing device configured to, in whole or in part, transmit instructions to or control operation of the system 100 or at least a portion thereof. In such an embodiment, the network may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network may include a public network, such as the Internet, a private network, such as an intranet, or combinations thereof, and may utilize a variety of networking protocols now available or later developed including, but not limited to TCP/IP based networking protocols. In some embodiments, the network may refer to a collection of wired connections such that the sortation system 100, the first sortation device 202, the second sortation device 200, and/or the controller 300 may be physically connected, via one or more networking cables or the like.

The controller 300 may include a processor, a memory, input/output circuitry, and/or communications circuitry. Although these components may be described in some cases using functional language, it should be understood that the particular implementations necessarily include the use of particular hardware. It should also be understood that certain of these components may include similar or common hardware. For example, two sets of circuitry may both leverage use of the same processor, memory, communications circuitry, or the like to perform their associated functions, such that duplicate hardware is not required for each set of circuitry. The use of the term “circuitry” as used herein includes particular hardware configured to perform the functions associated with respective circuitry described herein. As described in the example above, in some embodiments, various elements or components of the circuitry of the controller 300 may be housed within components of the sortation system 100. It will be understood in this regard that some of the components described in connection with the controller 300 may be housed within one or more of the devices of FIGS. 1-17C, while other components are housed within another of these devices, or by yet another device not expressly illustrated in FIGS. 1-17C.

Of course, while the term “circuitry” should be understood broadly to include hardware, in some embodiments, the term “circuitry” may also include software for configuring the hardware. For example, although “circuitry” may include processing circuitry, storage media, network interfaces, input/output devices, and the like, other elements of the controller 300 may provide or supplement the functionality of particular circuitry. By way of example, the processor (and/or co-processor or any other processing circuitry assisting or otherwise associated with the processor) may be in communication with the memory via a bus for passing information among components of the controller 300. The memory may be non-transitory and may include, for example, one or more volatile and/or non-volatile memories. In other words, for example, the memory may be an electronic storage device (e.g., a non-transitory computer readable storage medium). The memory may be configured to store information, data, content, applications, instructions, or the like, for enabling the controller 300 to carry out various functions in accordance with example embodiments of the present disclosure.

In addition, computer program instructions and/or other type of code may be loaded onto a computer, processor or other programmable circuitry to produce a machine, such that the computer, processor other programmable circuitry that execute the code on the machine create the means for implementing the various functions, including those described in connection with the components of controller 300.

With continued reference to FIG. 1, in some embodiments, the sortation system 100 may include one or more sensors 400. By way of example, the sensor(s) 400 may include any element configured to generate data that is indicative of a characteristic of the system 100. For example, the sensor(s) 400 may include one or more positional sensors configure to determine the position of one or more elements of the system 100 (e.g., a current position of a sortation table as described hereafter). Additionally or alternatively, the sensor(s) 400 may include one or more contact or proximity sensors configure to detect actual or imminent contact between one or more elements of the system 100 (e.g., so as to prevent unintended contact between, for example, the first sortation device 202 and the second sortation device 200). Additionally, the sensor(s) 400 may include one or more cameras, scanners, or the like configured to, for example, scan readable indicia of an example article sorted by the system 100. By way of a more particular example, a barcode scanner or equivalent mechanism may scan a barcode (e.g., readable indicia) attached to or defined by an article received by the system 100. The data generated by the sensor(s) 400 (e.g., camera, barcode scanner, etc.) may be transmitted to the controller 300 so as to determine the appropriate sortation operation (e.g., tilt operation, bomb bay operation, etc.) of the system 100. Similarly, one or more sensor(s) 400 may generated data indicative of the number of articles sorted by the system 100, such as indicative of a current or projected operational capacity of the system 100. Although described herein with reference to particular types of sensors and associated operations for using the same, the present disclosure contemplates that the sensor(s) 400 may include one or more sensors of any type, configuration, position, dimensions (e.g., size and shape), etc. without limitation.

Figure 2:
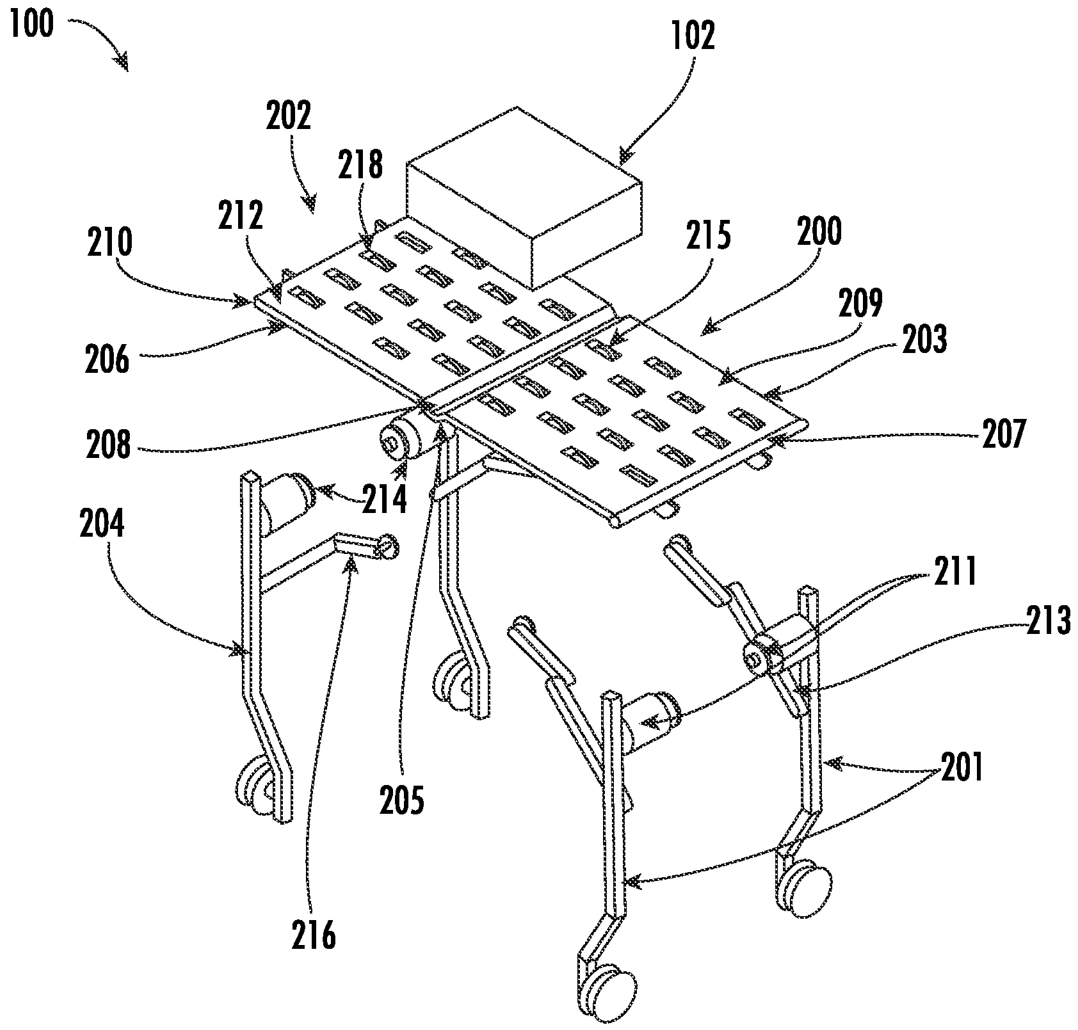
FIG. 2 illustrates an exploded view of the example sortation system of FIG. 1 in accordance with some example embodiments described herein.

Turning to the exploded view of FIG. 2, the system 100 as shown may include a first sortation device 202 that includes a first frame 204 and a first sortation table 206 movably attached to the first frame 204. The first frame 204 may define a support structure to which one or more elements of the first sortation device 202 may be attached. As such, the first frame 204 may be formed of any suitable material for the intended application of the first sortation device 202 (e.g., a material suitable for supporting the elements described herein). The first frame 204 may further be dimensioned (e.g., sized and shaped) to accommodate the elements of the first sortation device 202. By way of example, the first frame 204 may be dimensioned (e.g., sized and shaped) at least in part based upon the corresponding dimensions of the article 102 received by the system 100. In some embodiments, the frame 204 may include one or more guide wheels configured to allow the frame 204 to be repositionable relative one or more other elements within a material handling environment. In other embodiments, as described hereafter with reference to FIGS. 14A-14B, the frame may be formed integral to one or more other elements within a material handling environment, such as in a retrofit implementation.

The first sortation device 202 may further include the first sortation table 206 that defines a first end 208, a second end 210 opposite the first end 208, and a body extending therebetween. The body of the first sortation table 206 may, as shown, define a rectangular body (e.g., having a rectangular cross-sectional shape) configured to support the article 102 thereon, such as via a first surface 212 of the body. Although illustrated and described herein with reference to a rectangular body (e.g., a body having a rectangular cross-section) the present disclosure contemplates that the size and/or shape of the body of the first sortation table 206 may be similarly dimensioned based at least partially upon the dimensions of the article 102 and/or the intended application of the system 100. The second end 210 of the first sortation table 206 may be configured to pivotally attach the first sortation table 206 to the first frame 204 such that the first sortation table 206 may rotate about the second end 210. The first end 208 may be defined opposite the second end 210 so as to, in some embodiments, be positioned proximate a corresponding first end of another sortation table (e.g., first end 205 of second sortation table 203).

Figure 14A:
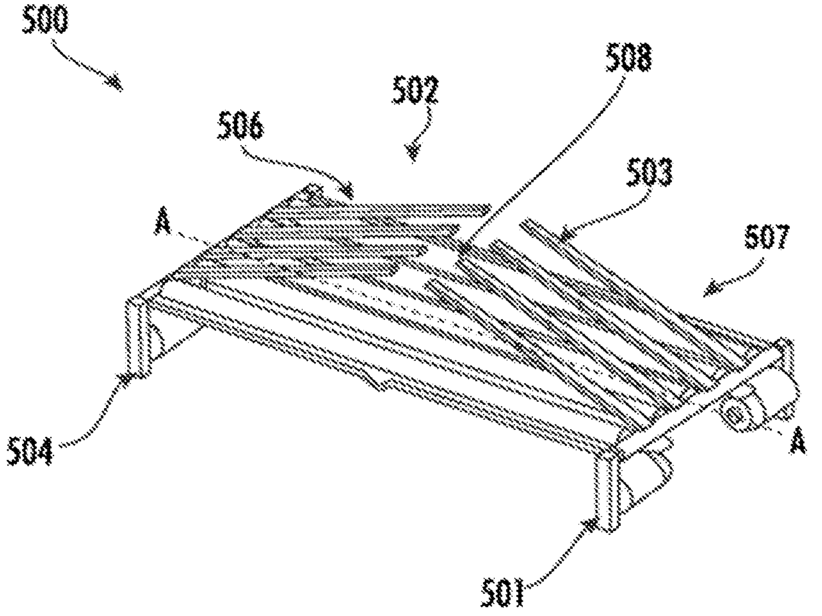
FIGS. 14A-14B illustrate an example sortation system in accordance with some example embodiments described herein.
Figure 14B:
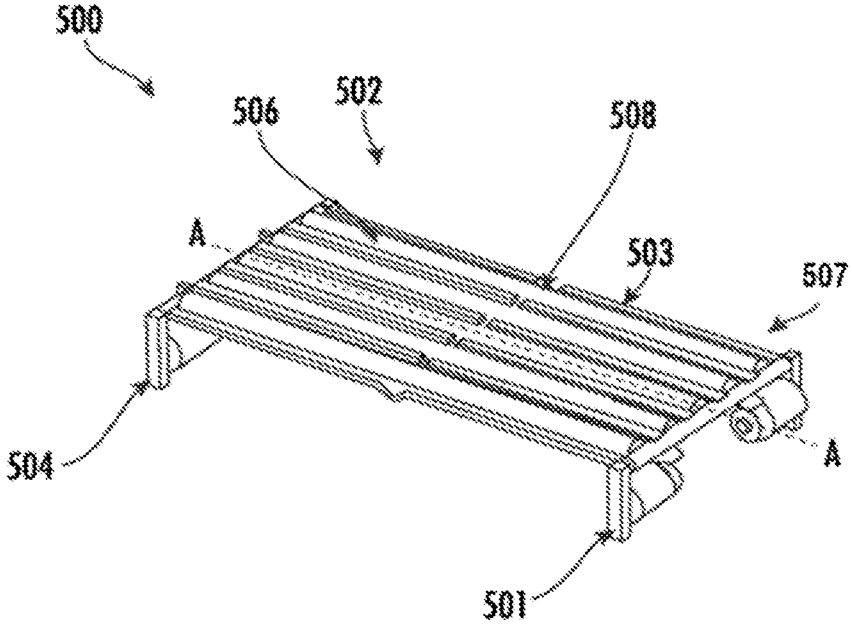
Figure 15A:
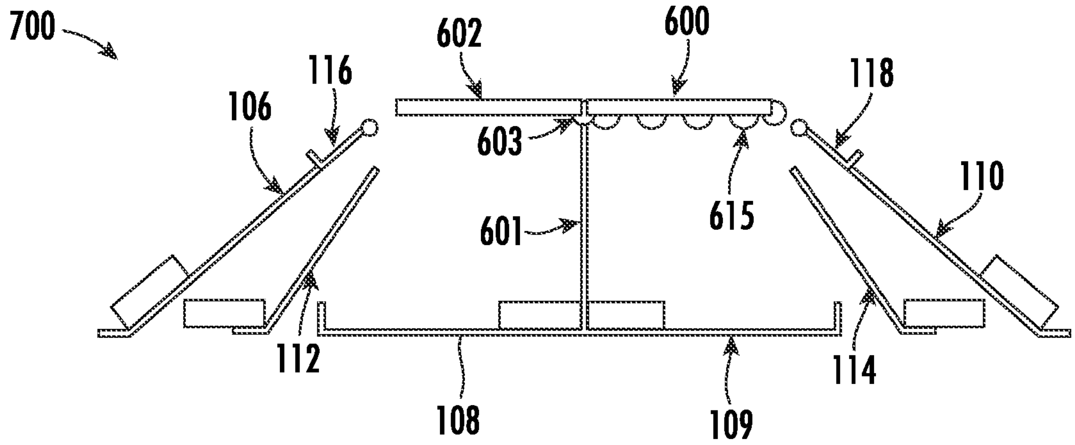
FIGS. 15A-15B illustrate a schematic view of an example sortation system in accordance with some example embodiments described herein.
Figure 15B:
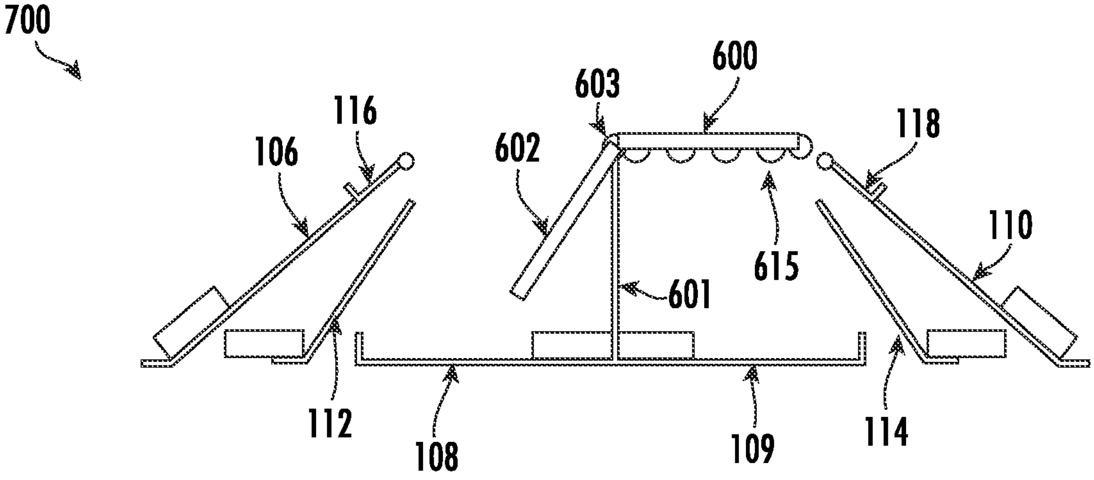
Figure 16A:
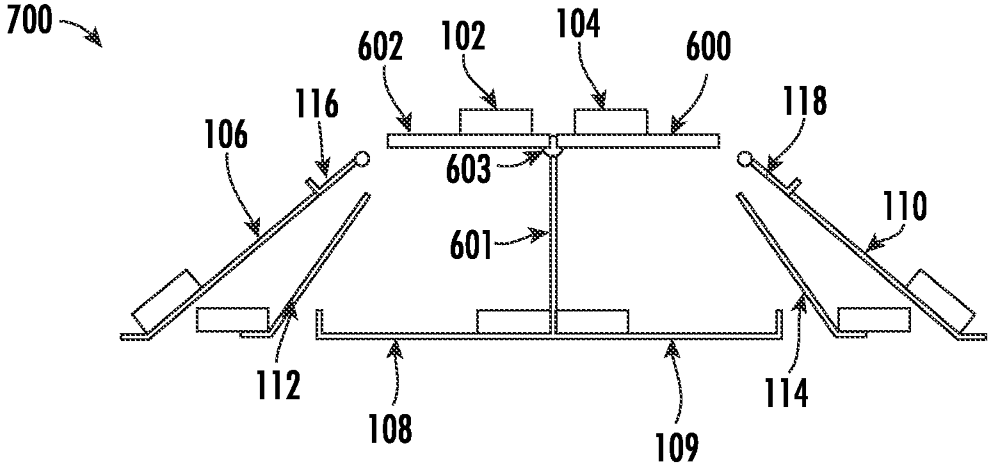
FIGS. 16A-16B illustrate an example bomb bay operation of the example sortation system of FIGS. 15A-15B in accordance with some example embodiments described herein.
Figure 16B:
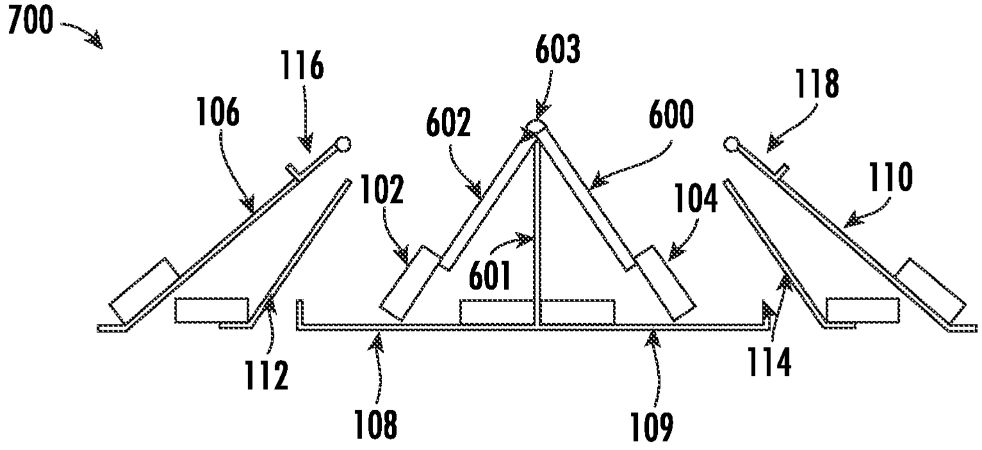

In some embodiments, the pivotal attachment between the second end 210 and the first frame 204 may occur at two (2) distinct attachment locations (e.g., at opposing ends of the body at the second end 210). In other embodiments, the pivotal attachment between the second end 210 and the first frame 204 may occur along a width of the body at the second end 210 (e.g., substantially perpendicular to an axis A extending between the first end 208 and the second end 210 as shown in FIGS. 14A-14B). In order to facilitate this rotational movement, the first frame 204 and/or the second end 210 of the first sortation table 206 may include one or more bearings, bushings, rolling elements, and/or the like to reduce the friction at this pivotal attachment location. As described hereafter with reference to an example bomb bay operation, the first end 208 may, for example, define an angled, sloped, chamfered, etc. portion configured to reduce or otherwise prevent impingement of the article 102 on the first surface 212 of the body during movement of the article relative the first sortation table 206.

The first sortation device 202 may further include a first rotation mechanism 214 operably coupled with the first sortation table 206. The first rotation mechanism 214 may be configured to cause rotation of the first sortation table 206 about the second end 210 so as to facilitate or otherwise cause a tilt operation and/or a bomb bay operation associated with the first sortation table 206 as described hereafter. The first rotation mechanism 214 may be attached to the first frame 204 and, in some embodiments, connected to the first sortation table 206 at the second end 210. By way of example, the first rotation mechanism 214 may include one or more motors, gearing systems (e.g., rack and pinion, simple gears, worm gears, etc.), or the like configured to, when powered, cause rotation of the first sortation table 206 in either a first direction (e.g., a counterclockwise direction) to perform a tilt operation or a second direction (e.g., a clockwise direction) to perform a bomb bay operation. In some embodiments, the first rotation mechanism 214 may be operably coupled with the controller 300 such that the controller 300 may control operation thereof. By way of example, the first rotation mechanism 214 may receive instructions from the controller 300 that cause the first rotation mechanism 214 to output a rotational force on the second end 210 of the first sortation table 206 to cause rotational movement of the first sortation table 206.

The first sortation device 202 may further include a first retraction mechanism 216 operably coupled with the first sortation table 206 and the frame 204. The first retraction mechanism 216 may be configured to cause rotation of the first sortation table 206 about the second end 210 to position the first sortation table 206 at a rest position. As described hereafter with reference to the example tilt operation and bomb bay operation, the first sortation table 206 may pivot about the second end 210 such that an angle between the first frame 204 and the first sortation table 206 changes (e.g., increases for a tilt operation and decreases for a bomb bay operation). In order to support the article 102 on the first surface 212 of the first sortation table 206, however, the first sortation device 202 may employ a first retraction mechanism 216 that operates to return the first sortation table 206 to a rest or neutral position that is, for example, a position at which the first sortation table 206 is positioned substantially perpendicular with respect to the first frame 204. Although described herein with reference to a substantially perpendicular rest position, the present disclosure contemplates that the rest position may refer to any position at which the article 102 may be supported by the first surface 212 of the first sortation table 206 at the rest position.

The first retraction mechanism 216 as shown may, in some embodiments, include one or more linkages connected between the first frame 204 and the first sortation table 206. By way of example, the first retraction mechanism 216 may be pivotally attached to the first frame 204 such that a linkage of the first retraction mechanism 216 pivots relative the first frame 204. The first retraction mechanism 216 may be connected with the first sortation table 206 such that another linkage of the first retraction mechanism 216 may translate along a length of the first sortation table 206 (e.g., between the first end 208 and the second end 210). Although described herein with reference to a set of linkages, the present disclosure contemplates that the first retraction mechanism 216 may include any element, feature, mechanism, etc. configured to cause the first sortation table 206 to be positioned at a rest or neutral position.

As described above, implementations of the present disclosure may rely upon a single sortation device (e.g., the first sortation device 202). As shown, however, the sortation system 100 may also include two or more sortation devices (e.g., first sortation device 202 and second sortation device 200). In this way, the second sortation device 200 may include one or more of the elements of the first sortation device 202 described above. In some embodiments, the second sortation device 200 may be identical to or substantially the same as the first sortation device 202 but positioned such that the first end 205 of the second sortation device 200 is proximate the first end 208 of the first sortation device 200 (e.g., a mirrored position).

Accordingly, the system 100 as shown may also include a second sortation device 200 that includes a second frame 201 and a second sortation table 203 movably attached to the second frame 201. The second frame 201 may define a support structure to which one or more elements of the second sortation device 200 may be attached. As such, the second frame 201 may also be formed of any suitable material for the intended application of the second sortation device 200 (e.g., a material suitable for supporting the elements described herein). The second frame 201 may further be dimensioned (e.g., sized and shaped) to accommodate the elements of the second sortation device 200. By way of example, the second frame 201 may be dimensioned (e.g., sized and shaped) at least in part based upon the corresponding dimensions of the article 102 received by the system 100 and/or the associated dimensions of the first sortation device 202. In some embodiments, the second frame 201 may include one or more guide wheels configured to allow the second frame 201 to be repositionable relative one or more other elements within a material handling environment. In other embodiments, as described hereafter with reference to FIGS. 14A-14B, the second frame 201 may be formed integral to one or more other elements within a material handling environment, such as in a retrofit implementation.

The second sortation device 200 may further include the second sortation table 203 that defines a first end 205, a second end 207 opposite the first end 205, and a body extending therebetween. The body of the second sortation table 203 may, as shown, define a rectangular body configured to support the article 102 thereon, such as via a second surface 209 of the body. Although illustrated and described herein with reference to a rectangular body (e.g., a body having a rectangular cross-section) the present disclosure contemplates that the size and/or shape of the body of the second sortation table 203 may be similarly dimensioned based at least partially upon the dimensions of the article 102 and/or the intended application of the system 100. The second end 207 of the second sortation table 203 may be configured to pivotally attach the second sortation table 203 to the second frame 201 such that the second sortation table 203 may rotate about the second end 207. The first end 205 may be defined opposite the second end 207 so as to, in some embodiments as described above, be positioned proximate a corresponding first end of another sortation table (e.g., the first end 208 of the first sortation table 206).

In some embodiments, the pivotal attachment between the second end 207 and the second frame 201 may occur at two (2) distinct attachment locations (e.g., at opposing ends of the body at the second end 207). In other embodiments, the pivotal attachment between the second end 207 and the second frame 201 may occur along a width of the body at the second end 207 (e.g., substantially perpendicular to an axis A extending between the first end and the second end as shown in FIGS. 14A-14B). In order to facilitate this rotational movement, the second frame 201 and/or the second end 207 of the second sortation table 203 may include one or more bearings, bushings, rolling elements, and/or the like to reduce the friction at this pivotal attachment location. As described hereafter with reference to an example bomb bay operation, the first end 205 may, for example, define an angled, sloped, chamfered, etc. portion configured to reduce or otherwise prevent impingement of the article 102 on the second surface 209 of the body during movement of the article 102 relative the second sortation table 203.

The second sortation device 200 may further include a second rotation mechanism 211 operably coupled with the second sortation table 203. The second rotation mechanism 211 may be configured to cause rotation of the second sortation table 203 about the second end 207 so as to facilitate or otherwise cause a tilt operation and/or a bomb bay operation associated with the second sortation table 203 as described hereafter. The second rotation mechanism 211 may be attached to the second frame 201 and, in some embodiments, connected to the second sortation table 203 at the second end 207. By way of example, the second rotation mechanism 211 may include one or more motors, gearing systems (e.g., rack and pinion, simple gears, worm gears, etc.), or the like configured to, when powered, cause rotation of the second sortation table 203 in either the second direction (e.g., a clockwise direction) to perform a tilt operation or the first direction (e.g., a counterclockwise direction) to perform a bomb bay operation. Said differently, due to the relative positioning of the second sortation device 200, rotation movement of the second sortation table 203 may be opposite (e.g., mirrored positioning) that of the first sortation table 206. In some embodiments, the second rotation mechanism 211 may also be operably coupled with the controller 300 such that the controller 300 may control operation thereof. By way of example, the second rotation mechanism 211 may receive instructions from the controller 300 that cause the second rotation mechanism 211 to output a rotational force on the second end 207 of the second sortation table 203 to cause rotational movement of the second sortation table 203.

The second sortation device 200 may further include a second retraction mechanism 213 operably coupled with the second sortation table 203 and the second frame 201. The second retraction mechanism 213 may be configured to cause rotation of the second sortation table 203 about the second end 207 to position the second sortation table 203 at a rest position. As described above with reference to the example tilt operation and bomb bay operation, the second sortation table 203 may pivot about the second end 207 such that an angle between the second frame 201 and the second sortation table 203 changes (e.g., increases for a tilt operation and decreases for a bomb bay operation). In order to support the article 102 on the second surface 209 of the second sortation table 203, however, the second sortation device 200 may employ a second retraction mechanism 213 that operates to return the second sortation table 203 to a rest or neutral position that is, for example, a position at which the second sortation table 203 is positioned substantially perpendicular with respect to the second frame 201 (e.g., substantially in in-line with the first sortation table 206). Although described herein with reference to a substantially perpendicular rest position, the present disclosure contemplates that the rest position may refer to any position at which the article 102 may be supported by the second surface 209 of the second sortation table 203 at the rest position.

The second retraction mechanism 213 as shown may, in some embodiments, include one or more linkages connected between the second frame 201 and the second sortation table 203. By way of example, the second retraction mechanism 213 may be pivotally attached to the second frame 201 such that a linkage of the second retraction mechanism 213 pivots relative the second frame 201. The second retraction mechanism 213 may be connected with the second sortation table 203 such that another linkage of the second retraction mechanism 213 may translate along a length of the second sortation table 203 (e.g., between the first end 205 and the second end 207). Although described herein with reference to a set of linkages, the present disclosure contemplates that the second retraction mechanism 213 may include any element, feature, mechanism, etc. configured to cause the second sortation table 203 to be positioned at a rest or neutral position.

Figure 3:
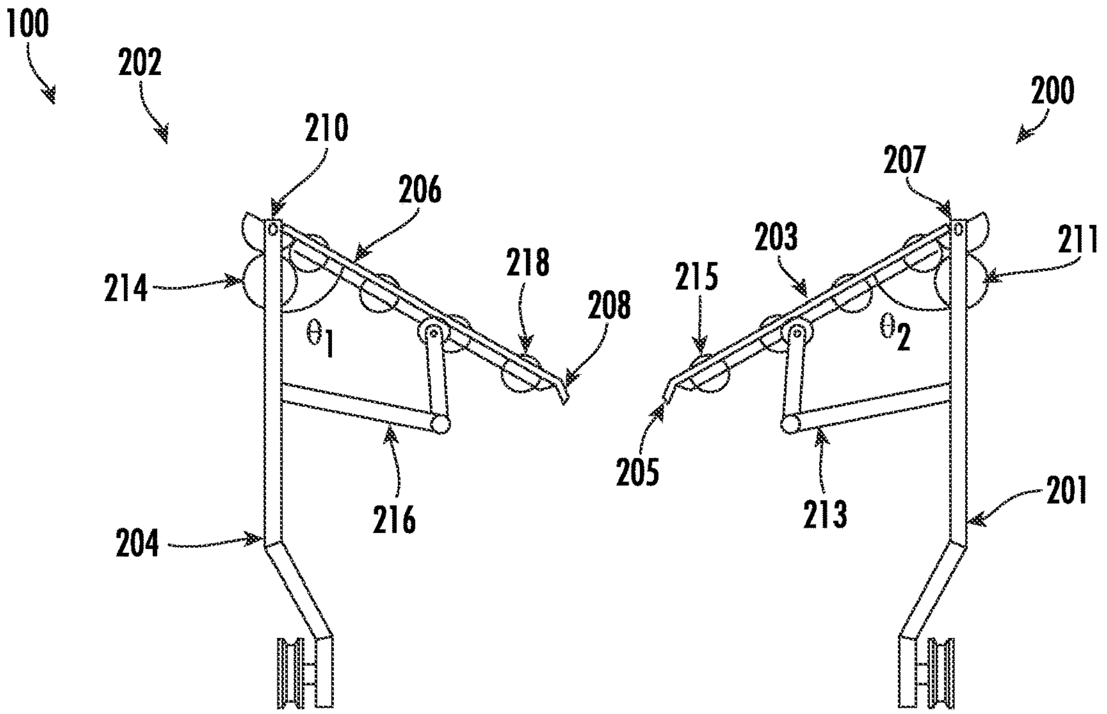
FIGS. 3-4 illustrate side views of the example sortation system of FIG. 1 during an example bomb bay operation in accordance with some example embodiments described herein.
Figure 4:
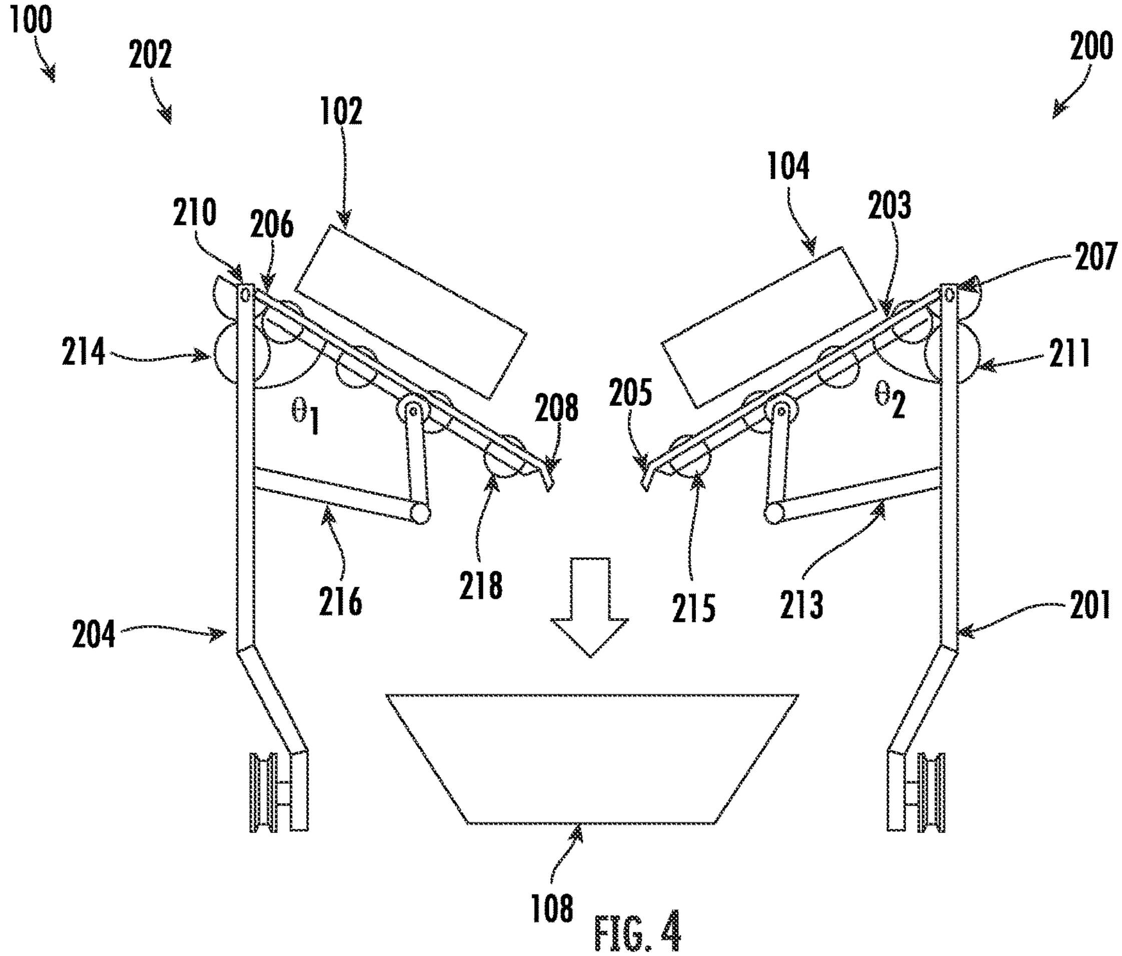

With reference to FIGS. 3-4, the system 100 is illustrated performing a bomb bay operation. As shown in FIG. 4, for example, the first sortation device 202 and the second sortation device 200 may be positioned relative a second chute 108 (e.g., a chute positioned between the first sortation device 202 and the second sortation device 200) such that a bomb bay operation as described herein may result in transfer of one or more articles supported by the system 100 into the second chute 108. As shown, an angle $\Theta_1$ may be defined between the first frame 204 and the first sortation table 206. The rotation of the first sortation table 206 about the pivotal attachment between the second end 210 and the first frame 204 in the second direction (e.g., clockwise) may be such that the angle $\Theta_1$ between the first frame 204 and the first sortation table 206 decreases. In doing so, the first article 102 supported by the first surface 212 of the first sortation table 206 may translate relative the first sortation table 206 and be transferred into the second chute 108. Similarly, an angle $\Theta_2$ may be defined between the second frame 201 and the second sortation table 203. The rotation of the second sortation table 203 about the pivotal attachment between the second end 207 and the second frame 201 in the first direction (e.g., counterclockwise) may be such that the angle $\Theta_2$ between the second frame 201 and the second sortation table 203 decreases. In doing so, the second article 104 supported by the second surface 209 of the second sortation table 203 may translate relative the second sortation table 203 and be transferred into the second chute 108. Although described herein with reference to transfer of separate articles 102, 104, the present disclosure contemplates that the first sortation device 202 and the second sortation device 200 may each support and/or transfer a plurality of articles alone or collectively.

Figure 5:
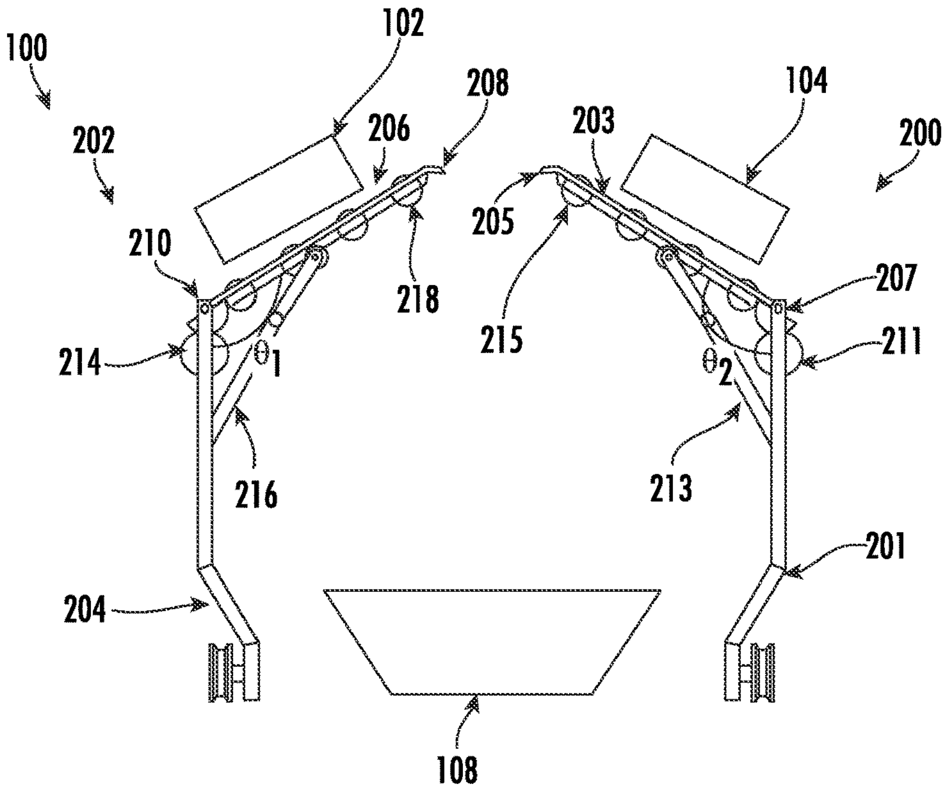
FIG. 5 illustrates a side view of the example sortation system of FIG. 1 during an example tilt operation in accordance with some example embodiments described herein.

With reference to FIG. 5, the system 100 is illustrated performing a tilt operation. As shown, the rotation of the first sortation table 206 about the pivotal attachment between the second end 210 and the first frame 204 in the first direction (e.g., counterclockwise) may be such that the angle $\Theta_1$ between the first frame 204 and the first sortation table 206 increases. In doing so, the first article 102 supported by the first surface 212 of the first sortation table 206 may translate relative the first sortation table 206 and be transferred towards the second end 210 (e.g., into a chute positioned proximate the second end 210 as described hereafter). Similarly, the rotation of the second sortation table 203 about the pivotal attachment between the second end 207 and the second frame 201 in the second direction (e.g., clockwise) may be such that the angle $\Theta_2$ between the second frame 201 and the second sortation table 203 increases. In doing so, the second article 104 supported by the second surface 209 of the second sortation table 203 may also translate relative the second sortation table 203 and be transferred towards the second end 207 (e.g., into a chute positioned proximate the second end 207 as described hereafter). Such a tilt operation may similarly occur for a plurality of articles (e.g. in combination, simultaneously, etc.).

Figure 6:
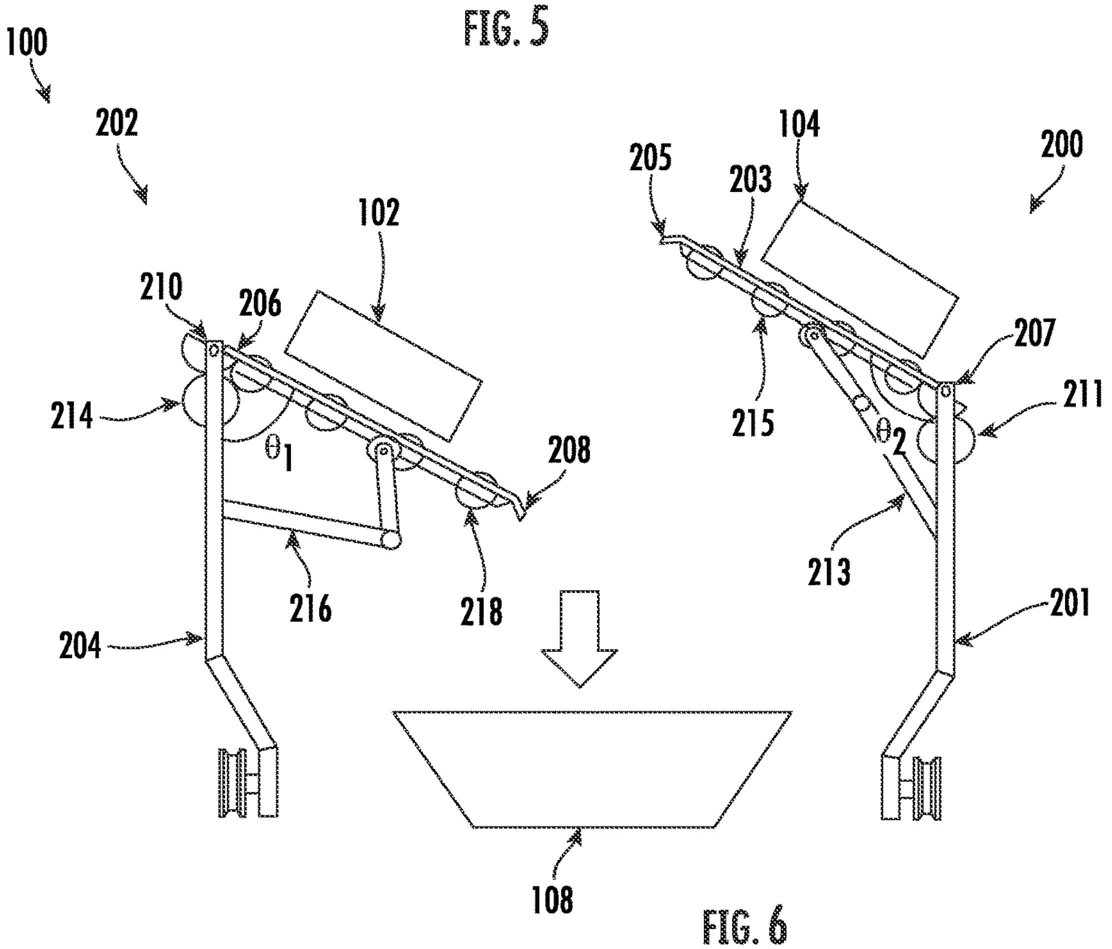
FIG. 6 illustrates a side view of the example sortation system of FIG. 1 in which a first sortation device performs a bomb bay operation and a second sortation device performs a tilt operation in accordance with some example embodiments described herein.

Although illustrated in FIGS. 3-5 as performing similar operations, the system 100 may, as shown in FIG. 6, include operations in which one sortation device performs a bomb bay operation and another sortation device performs a tilt operation. As shown, the first sortation device 202 may perform a bomb bay operation as described above with reference to FIGS. 3-4. In particular, the rotation of the first sortation table 206 about the pivotal attachment between the second end 210 and the first frame 204 in the second direction (e.g., clockwise) may be such that the angle $\Theta_1$ between the first frame 204 and the first sortation table 206 decreases. In doing so, the first article 102 supported by the first surface 212 of the first sortation table 206 may translate relative the first sortation table 206 and be transferred into the second chute 108. As shown, the second sortation device 200 may perform a tilt operation as described above with reference to FIG. 5. In particular, the rotation of the second sortation table 203 about the pivotal attachment between the second end 207 and the second frame 201 in the second direction (e.g., clockwise) may be such that the angle $\Theta_2$ between the second frame 201 and the second sortation table 203 increases. In doing so, the second article 104 supported by the second surface 209 of the second sortation table 203 may also translate relative the second sortation table 203 and be transferred towards the second end 207 (e.g., into a chute positioned proximate the second end 207 as described hereafter).

Figure 7:
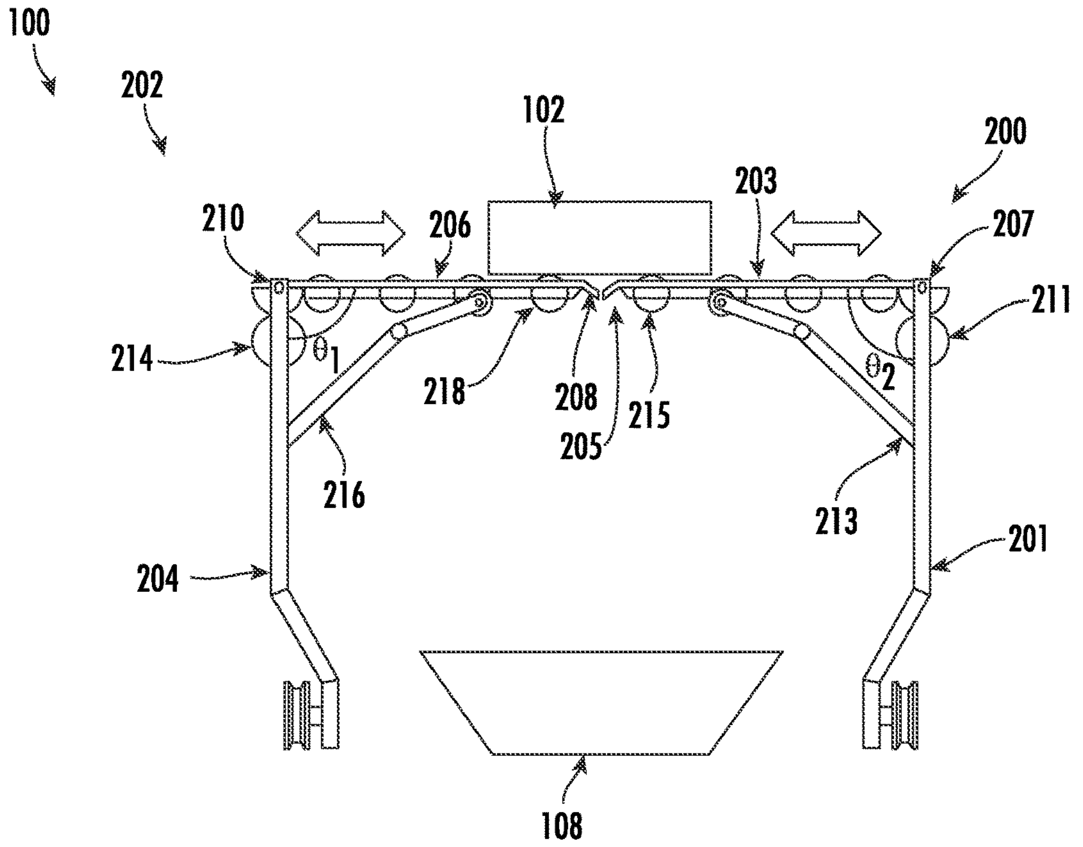
FIGS. 7-9 illustrate side views of the example sortation system of FIG. 1 repositioning an article in accordance with some example embodiments described herein.
Figure 8:
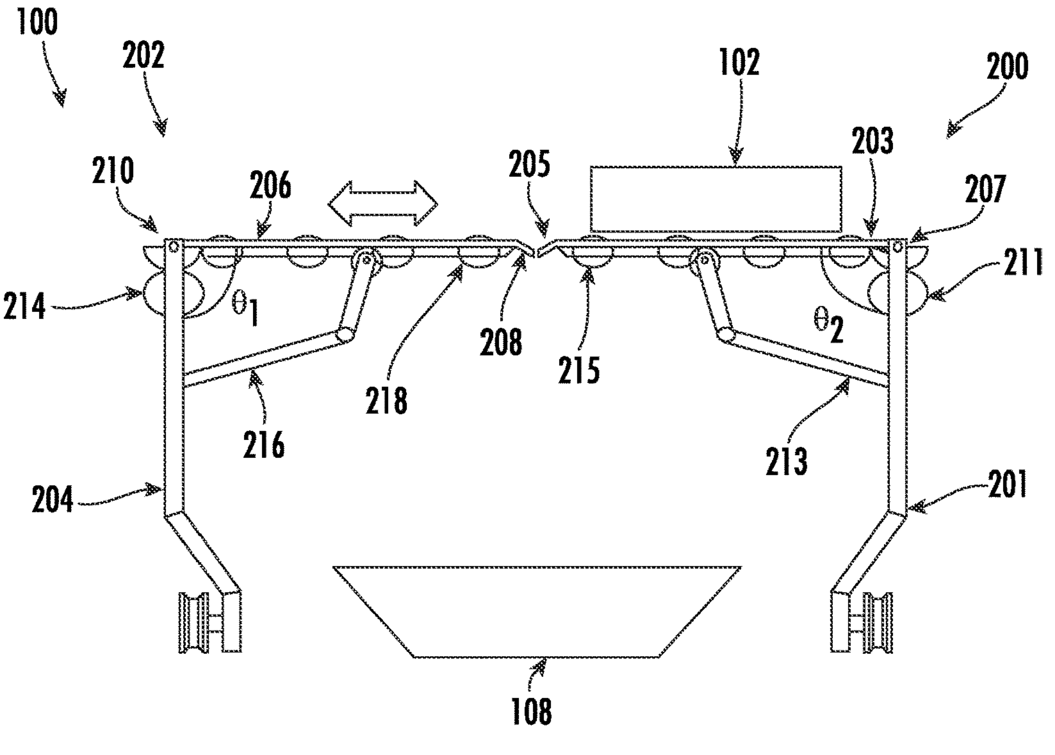
Figure 9:
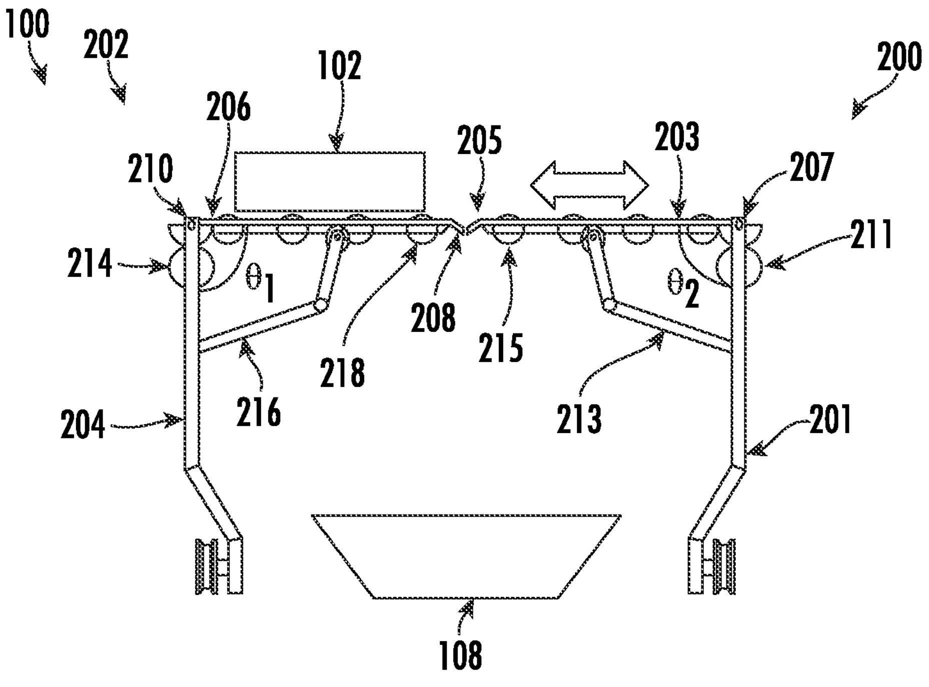

In some embodiments, as shown in FIGS. 7-9, the system 100 may be configured to perform diversion operations in which the position of an article supported by the first sortation table 206 and/or the second sortation table 203 is changed. For example, the first sortation table 206 may include one or more first rollers 218 supported by the body of the first sortation table 206. The one or more first rollers 218 may be configured to translate the first article 102 relative the first surface 212 of the body. The one or more first rollers 218 may be operably connected with a motor (not shown) and/or the controller 300 so as to receive instructions from the controller 300 regarding the diversion operation associated with the article 102. For example, the motor (not shown) may receive instructions from the controller 300 that cause rotation of the one or more first rollers 218 to cause translation of the article 102 relative the first sortation table 206. In some embodiments, the one or more first rollers 218 may be pop-up rollers in that the one or more first rollers 218 may move between a retracted position and an extended position. For example, the one or more first rollers 218 may move between a retracted position in which the one or more first rollers 218 are stored within the body of the first sortation table 206 and an extended position wherein at least a portion of the one or more first rollers 218 extends beyond the first surface 212 of the body so as to contact the article 102 supported thereon.

Similarly, the second sortation table 203 may include one or more second rollers 215 supported by the body of the second sortation table 203. The one or more second rollers 215 may also be configured to translate the first article 102 relative the second surface 209 of the body. The one or more second rollers 215 may be operably connected with a motor (not shown) and/or the controller 300 so as to receive instructions from the controller 300 regarding the diversion operation associated with the article 102. For example, the motor (not shown) may receive instructions from the controller 300 that cause rotation of the one or more second rollers 215 to cause translation of the article 102 relative the second sortation table 203. In some embodiments, the one or more second rollers 215 may also be pop-up rollers in that the one or more second rollers 215 may move between a retracted position and an extended position. For example, the one or more second rollers 215 may also move between a retracted position in which the one or more second rollers 215 are stored within the body of the second sortation table 203 and an extended position wherein at least a portion of the one or more second rollers 215 extends beyond the second surface 209 of the body so as to contact the article 102 supported thereon.

Figure 10A:
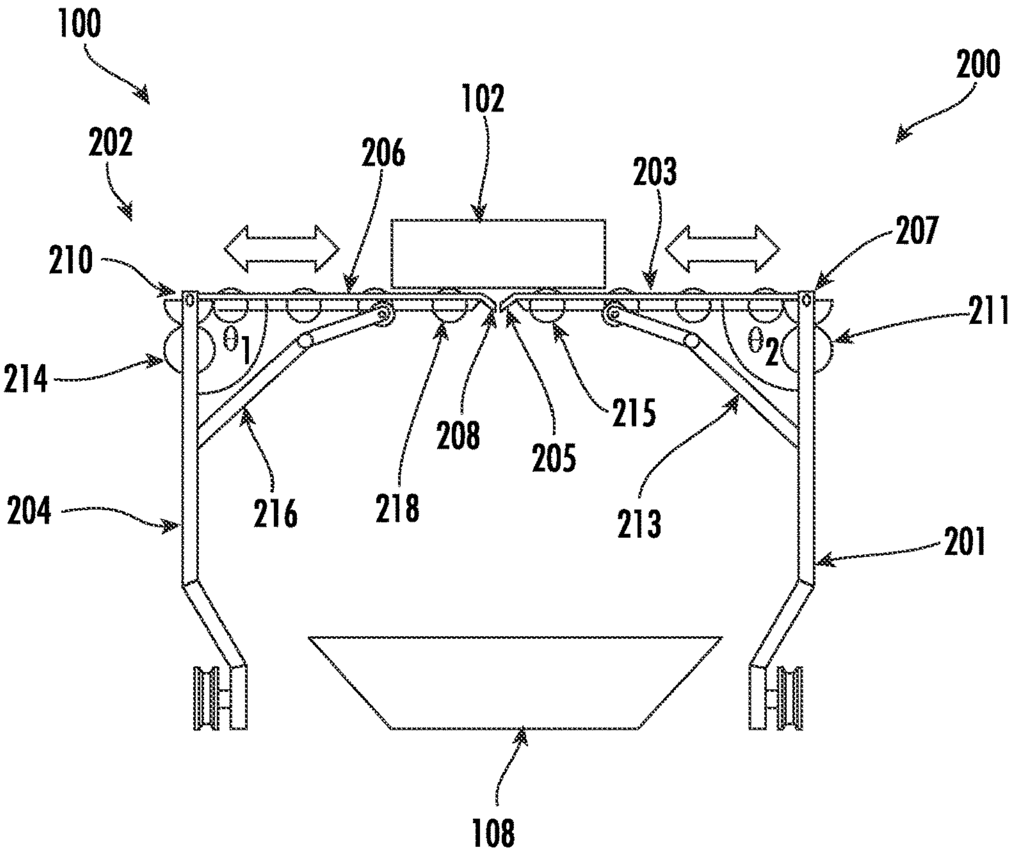
FIGS. 10A-10B illustrate side views of the example sortation system of FIG. 1 during a repositioning and subsequent bomb bay operation in accordance with some example embodiments described herein.
Figure 10B:
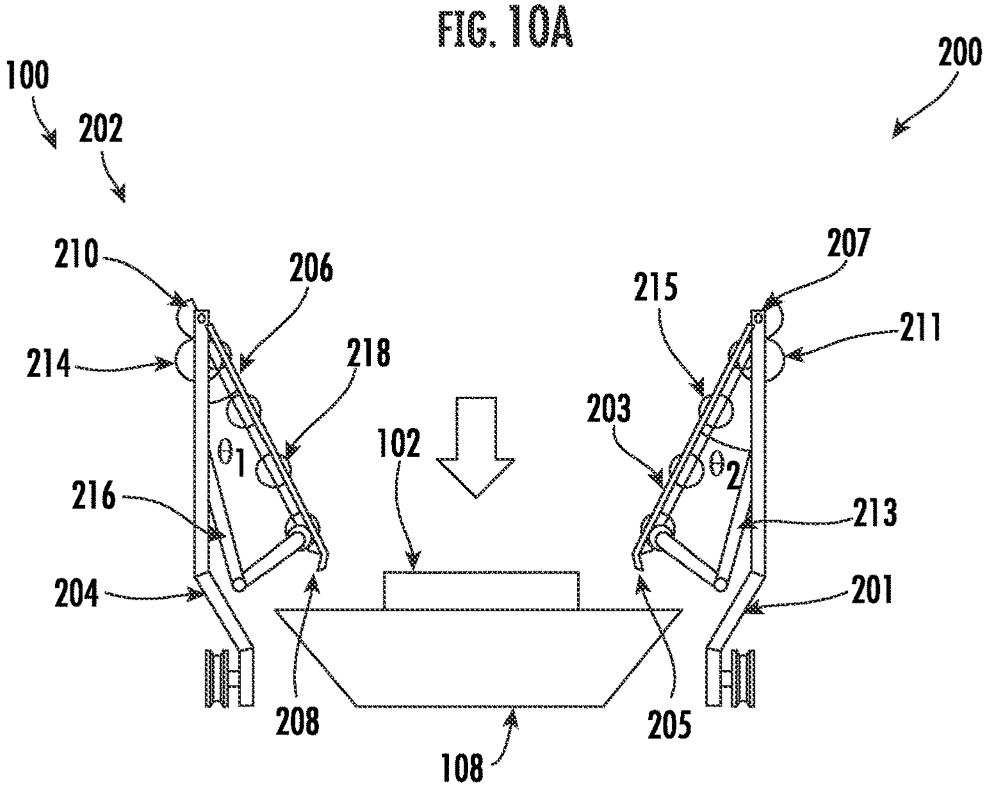
Figure 11:
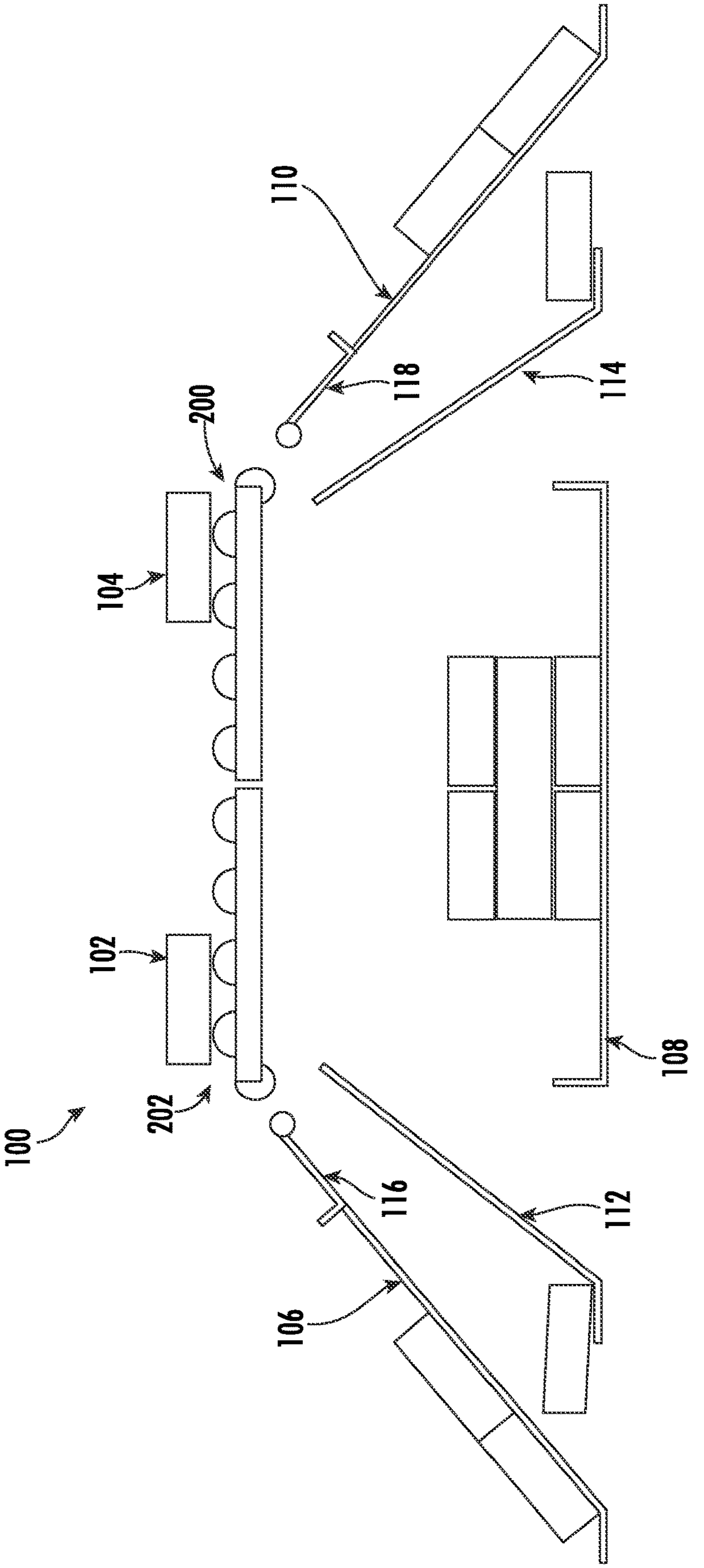
FIG. 11 illustrates a schematic view of an example sortation system in accordance with some example embodiments described herein.
Figure 12B:
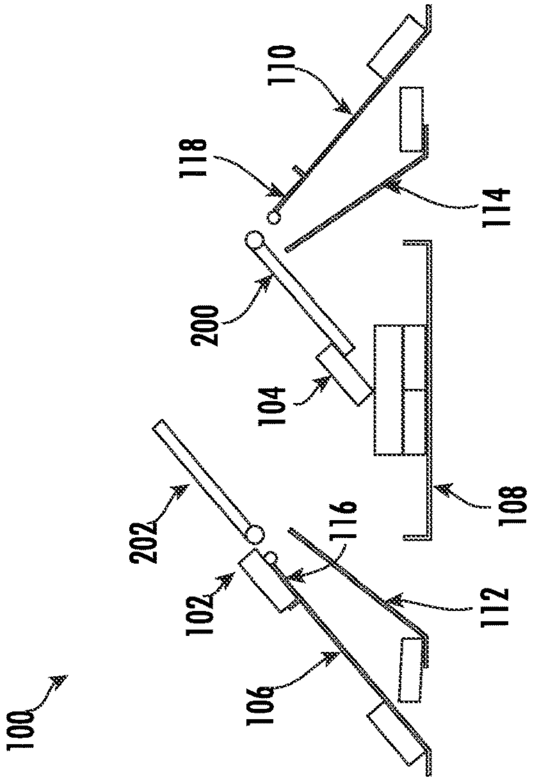
FIGS. 12A-12C illustrate example bomb bay and tilt operations of the example sortation system of FIG. 11 in accordance with some example embodiments described herein.
Figure 12A:
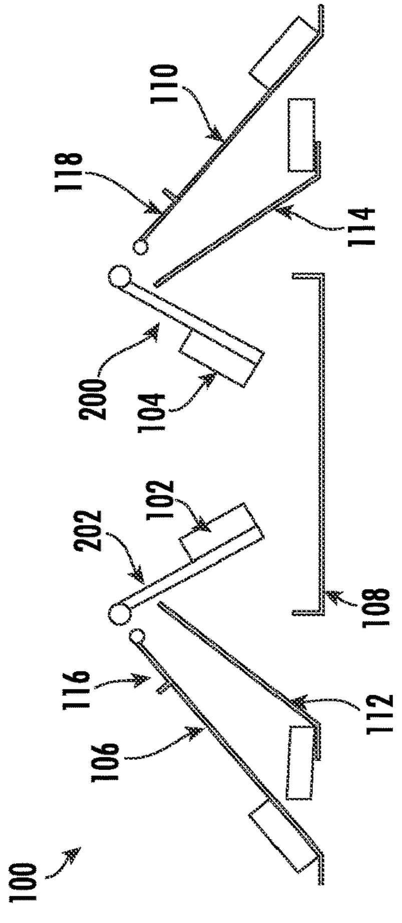
Figure 12C:
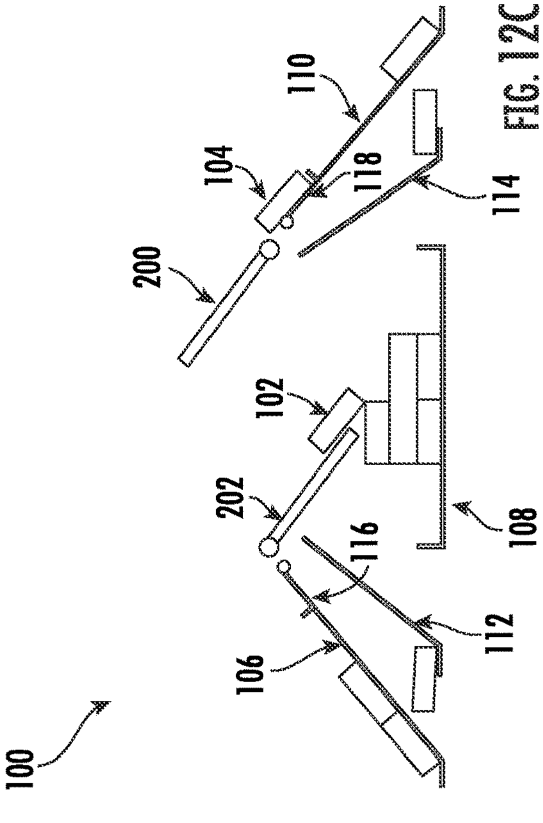

With reference to FIGS. 10A-10B, in some embodiments, the diversion operations described above may be used to reposition the article 102 such that at least a portion of the first sortation device 202 and at least a portion of the second sortation device 200 support the article 102. By way of example, in some embodiments, the article 102 may be fragile such that preventing excessive movement of the article 102 operates to prevent unintended damage to the article 102 (e.g., the contents thereof). As such, the one or more first rollers 218 and/or the one or more second rollers 215 may operate to reposition the article 102 in a central location partially supported by the first end 208 of the first sortation table 206 and partially supported by the first end 205 of the second sortation table 203. As shown in FIG. 10B, this position may result in transfer of the article 102 without excess movement, contact, or the like to the second chute 108.

With reference to FIGS. 11-13C, the system 100 is illustrated schematically with one or more chutes of an example material handling environment. As shown, the first sortation device 202 may be operably coupled with a first chute 106 so as to receive articles from the first sortation device 202 via a tilt operation as described above. For example, the first frame 204 of the first sortation device 202 may be connected with the first chute 106 so that articles may be transferred from the first sortation table 206 to the first chute 106. Similarly, the second sortation device 200 may be operably coupled with a third chute 110 so as to receive articles from the second sortation device 200 via a tilt operation as described above. For example, the second frame 201 of the second sortation device 200 may be connected with the third chute 110 so that articles may be transferred from the second sortation table 203 to the third chute 110. The system 100 may, as described above with reference to FIGS. 3-4, be coupled with a second chute 108 positioned between the first sortation device 202 and the second sortation device 200 such that a bomb bay operation may operate to transfer articles (e.g., first article 102 and/or second article 104) to the second chute 108. As illustrated, FIG. 12A shows an example bomb bay operation by both the first sortation device 202 and the second sortation device 200. FIG. 12B illustrates a tilt operation by the first sortation device 202 and a bomb bay operation by the second sortation device. FIG. 12C illustrates a bomb bay operation by the first sortation device 202 and a tilt operation by the second sortation device 200.

Figure 13A:
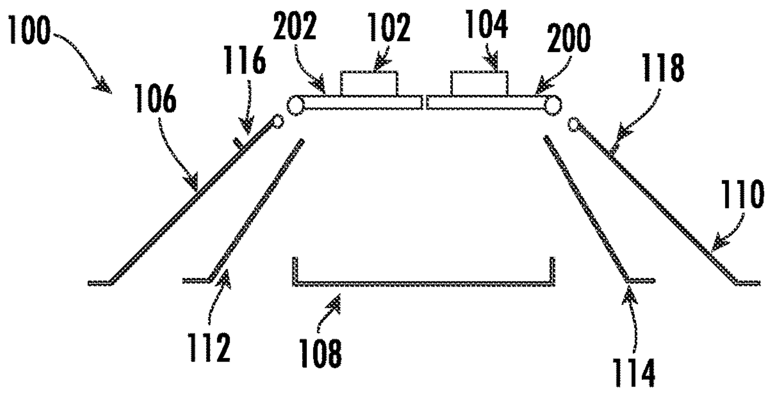
FIGS. 13A-13C illustrate example tilt and diversion operations of the example sortation system of FIG. 11 in accordance with some example embodiments described herein.
Figure 13B:
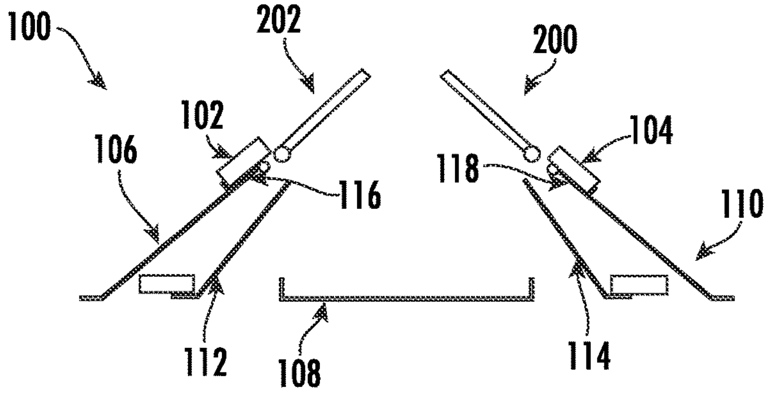
Figure 13C:
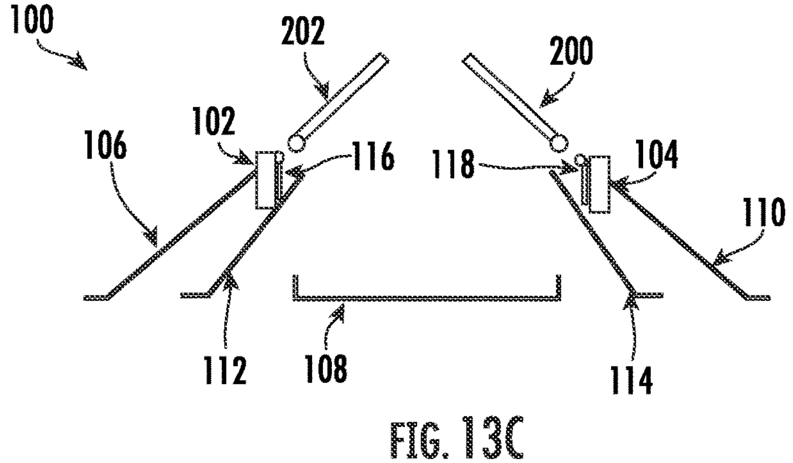

In some embodiments, as shown in FIGS. 13A-13C, the first chute 106 and/or the third chute 110 may further include respective chute diverters 116, 118. As shown, the first chute diverter 116 may operably couple the first chute 106 with a fourth chute 112, and the second chute diverter 118 may operably couple the third chute 110 with a fifth cute 114. In operation, a tilt operation by the first sortation device 202 may transfer a first article 102 to the first chute 106. The first chute diverter 116 may receive the first article 102 and divert the direction of travel of the first article 102 to the fourth chute 112. Similarly, a tilt operation by the second sortation device 200 may transfer a second article 104 to the third chute 110. The second chute diverter 118 may receive the second article 104 and divert the direction of travel of the second article 104 to the fifth chute 114. The present disclosure contemplates that the system 100 may be configured for use with material handling environments of any type such that the first sortation device 202 and/or the second sortation device 200 may be configured for use with any number of chutes and/or chute diverters based upon the intended application of the system 100.

With reference to FIGS. 14A-14B, another example sortation system 500 (e.g., system 500) of the present disclosure is illustrated. As described above, in some embodiments, the systems described herein may be used to retrofit existing systems. As such, the sortation system 500 of the present application may include a first sortation device 502 that includes a first frame 504 and a first sortation table 506. The first sortation device 502 may operate similar to the first sortation device 202 of FIGS. 1-13C when performing a tilt operation. Similarly, the sortation system 500 of the present application may include a second sortation device 507 that includes a second frame 501 and a second sortation table 503. The second sortation device 507 may operate similar to the second sortation device 203 of FIGS. 1-13C when performing a tilt operation. In the system 500, however, one or more conveyors 508 may be coupled with the first sortation device 502 and/or the second sortation device 507. The one or more conveyors 508 may be positioned substantially perpendicular to an axis A (e.g., an axis that extends between the first ends and the second ends of the respective sortation device 502, 507). In operation, articles may be conveyed by the conveyors 508 in a direction substantially perpendicular with respect to axis A, and the first sortation device 502 and/or the second sortation device 507 may operate to transfer these articles via respective tilt operations.

With reference to FIGS. 15-17C, another example sortation system 700 (e.g., system 700) is schematically illustrated. In some embodiments, the first sortation device and the second sortation device may be fixed to a common frame such that each sortation device pivots about a common location on the common frame. The system 700 as shown may include a first sortation device 602 that includes substantially the same features of the first sortation device 202 described above. Similarly, the system 700 may include a second sortation device 600 that includes substantially the same features of the second sortation device 200 described above. The system 700, however, may include a frame 601 to which a first end of the first sortation table of the first sortation device 602 is attached and to which a first end of the second sortation table of the second sortation device 600 is attached (e.g., at first location 603). In this way, a bomb bay operation by the first sortation device 602 refers to a rotation of the first sortation table about the pivotal attachment between the first end and the frame 601 in the first direction (e.g., a counterclockwise direction) to transfer an article to a third chute 108. A bomb bay operation by the second sortation device 600 refers to a rotation of the second sortation table about the pivotal attachment between the first end and the frame 601 in the second direction (e.g., a clockwise direction) to transfer an article to a sixth chute 109. Although illustrated as distinct chutes 108, 109, the present disclosure contemplates that the third chute 108 and the sixth cute 109 may, for example, be a common chute.

Figure 17A:
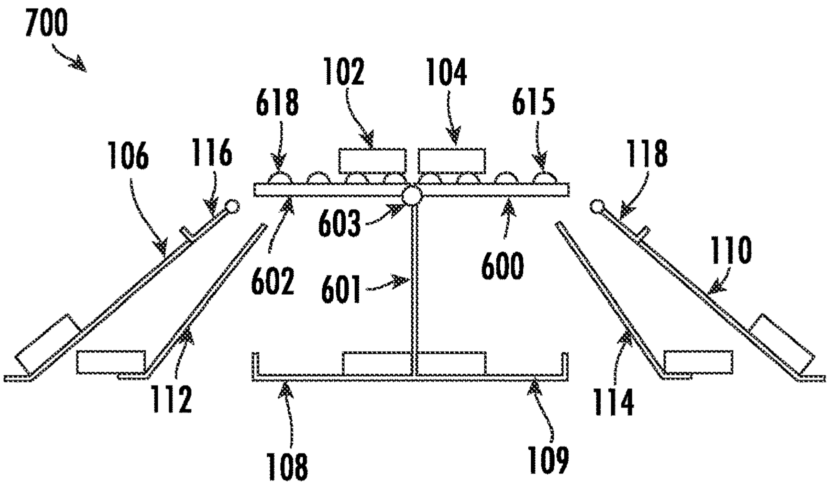
FIGS. 17A-17C illustrate example diversion operations of the example sortation system of FIGS. 15A-15B in accordance with some example embodiments described herein.
Figure 17B:
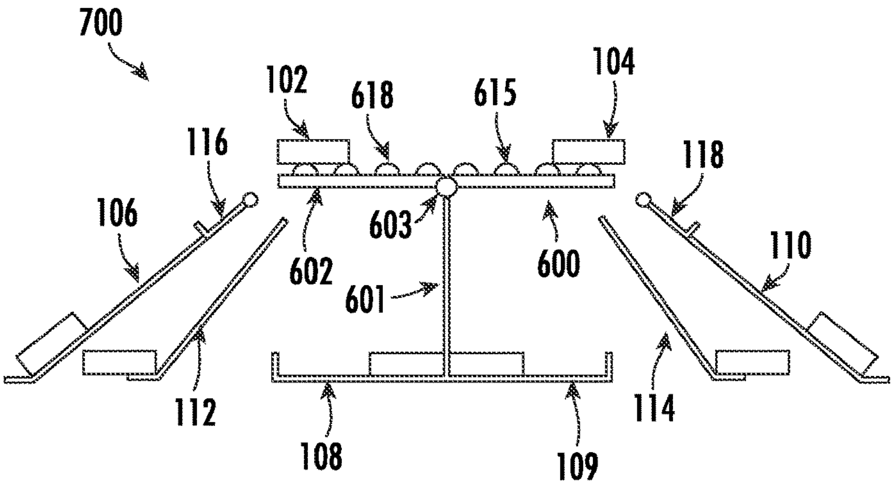
Figure 17C:
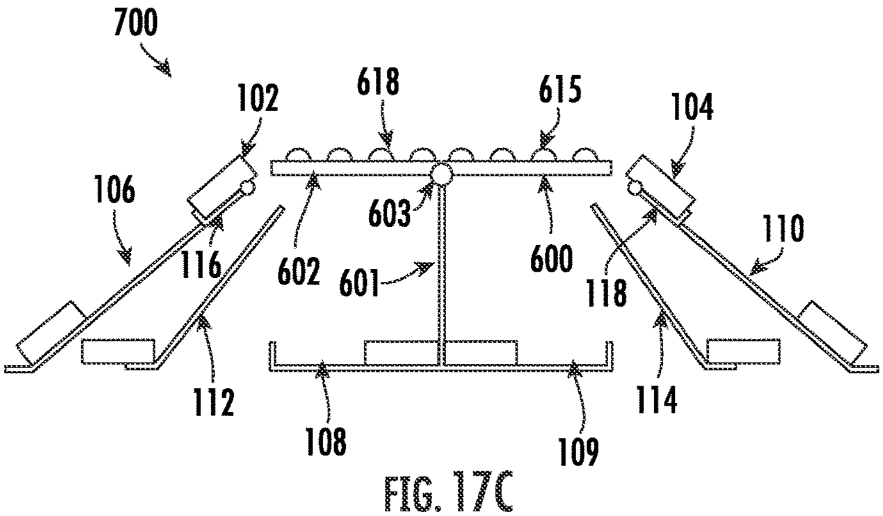

In system 600, a first tilt operation of the first sortation device 602 may occur in which the first sortation table rotates about the pivotal attachment between the first end and the first location 603 of the frame 601 in a second direction (e.g., a clockwise direction), such as to transfer an article supported by the first sortation device 602 to the second sortation device 600. Similarly, a second tilt operation of the second sortation device 600 may occur in which the second sortation table rotates about the pivotal attachment between the first end and the first location 603 of the frame 601 in a first direction (e.g., a counterclockwise direction), such as to transfer an article supported by the second sortation device 600 to the first sortation device 602. As shown in FIGS. 17A-17C, the system 600 may also include rollers to perform diversion operations. For example, the system 600 may include one or more first rollers 618 supported by the body of the first sortation table of the first sortation device 602. The one or more first rollers 618 may be configured to translate the first article 102 relative the first sortation device 602, such as to transfer the first article 102 to the first chute 106 (e.g., a diversion operation instead of a tilt operation as described above with reference to system 100). Similarly, the system 600 may include one or more second rollers 615 supported by the body of the second sortation table of the second sortation device 600. The one or more second rollers 615 may be configured to translate the second article 104 relative the second sortation device 600, such as to transfer the second article 104 to the third chute 110 (e.g., a diversion operation instead of a tilt operation as described above with reference to system 100).

The embodiments described herein may also be scalable to accommodate at least the aforementioned applications. Various components of embodiments described herein can be added, removed, reorganized, modified, duplicated, and/or the like as one skilled in the art would find convenient and/or necessary to implement a particular application in conjunction with the teachings of the present disclosure. Moreover, specialized features, characteristics, materials, components, and/or equipment may be applied in conjunction with the teachings of the present disclosure as one skilled in the art would find convenient and/or necessary to implement a particular application in light of the present disclosure.

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated, in light of the present disclosure, that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

What is claimed is:

1. A sortation device comprising:
a frame; and
a sortation table movably attached to the frame, the sortation table defining:
a first end;
a second end opposite the first end, the second end configured to pivotally attach the sortation table to the frame; and
a body extending therebetween, the body defining a first surface configured to support one or more articles thereon, wherein the sortation device is configured to perform:
a tilt operation in which the sortation table rotates about a pivotal attachment between the second end and the frame in a first direction, wherein the sortation table transfers the one or more articles to a first chute via the tilt operation; and
a bomb bay operation in which the sortation table rotates about the pivotal attachment between the second end and the frame in a second direction opposite the first direction, wherein the sortation table transfers the one or more articles to a second chute via the bomb bay operation, and
one or more rollers supported by the body of the sortation table and configured to position the one or more articles in a central location partially supported by the first end of the sortation device and partially supported by one end of another sortation table of another sortation device, wherein the one or more articles are positioned in the central location to transfer the one or more articles to the second chute.

2. The sortation device according to claim 1, wherein rotation of the sortation table about the pivotal attachment between the second end and the frame in the first direction is such that an angle between the frame and the sortation table increases.

3. The sortation device according to claim 1, wherein rotation of the sortation table about the pivotal attachment between the second end and the frame in the second direction is such that an angle between the frame and the sortation table decreases.

4. The sortation device according to claim 1, further comprising a rotation mechanism connected to the sortation table and configured to cause rotation of the sortation table about the second end so as to perform the tilt operation and/or the bomb bay operation.

5. The sortation device according to claim 1, further comprising a retraction mechanism connected to the sortation table and the frame, the retraction mechanism configured to cause rotation of the sortation table about the second end to position the sortation table at a rest position, wherein the sortation table is positioned substantially perpendicular with respect to the frame at the rest position.

6. The sortation device according to claim 1, wherein the one or more rollers are configured to move between:
a retracted position in which the one or more rollers are stored within the body of the sortation table; and
an extended position wherein at least a portion of the one or more rollers extends beyond the first surface of the body so as to contact the one or more articles supported thereon.

7. The sortation device according to claim 1, further comprising one or more conveyors coupled with the first surface of the body, the one or more conveyors positioned substantially perpendicular to an axis extending between the first end and the second end.

8. A sortation system comprising:
a first sortation device comprising:
a first frame; and
a first sortation table movably attached to the first frame, the first sortation table defining:
a first end of the first sortation table;
a second end of the first sortation table opposite the first end of the first sortation table, the second end of the first sortation table configured to pivotally attach the first sortation table to the first frame; and
a first body extending therebetween, the first body defining a first surface configured to support a first article thereon,
one or more first rollers supported by the first body of the first sortation table,
wherein the first sortation device is configured to perform:
a first tilt operation in which the first sortation table rotates about a pivotal attachment between the second end and the first frame in a first direction; and
a first bomb bay operation in which the first sortation table rotates about the pivotal attachment between the second end and the first frame in a second direction opposite the first direction; and
a second sortation device comprising:
a second frame; and
a second sortation table movably attached to the second frame, the second sortation table defining:
a first end of the second sortation table;
a second end of the second sortation table opposite the first end of the second sortation table, the second end of the second sortation table configured to pivotally attach the second sortation table to the second frame; and
a second body extending therebetween, the second body defining a second surface configured to support the first article and/or a second article thereon, and
one or more second rollers supported by the second body of the second sortation table, wherein the second sortation device is configured to perform:
a second tilt operation in which the second sortation table rotates about the pivotal attachment between the second end and the second frame in the second direction; and
a second bomb bay operation in which the second sortation table rotates about the pivotal attachment between the second end and the second frame in the first direction opposite the second direction,
wherein the first sortation table is configured to transfer the first article and/or the second article to a first chute via the first tilt operation,
wherein the first sortation table and the second sortation table are configured to transfer the first article and/or the second article to a second chute via the first bomb bay operation and/or the second bomb bay operation, and wherein at least one of the one or more first rollers and the one or more second rollers is configured to position one of the first article or the second article in a central location partially supported by the first end of the first sortation device and partially supported by the first end of the second sortation device, wherein the one of the first article or the second article is positioned at the central location to transfer the one of the first article or the second article to the second chute.

9. The sortation system according to claim 8, wherein a rotation of the first sortation table about the pivotal attachment between the second end and the first frame in the first direction and a rotation of the second sortation table about the pivotal attachment between the second end and the second frame in the second direction is such that a first angle between the first frame and the first sortation table and a second angle between the second frame and the second sortation table increases.

10. The sortation system according to claim 8, wherein a rotation of the first sortation table about the pivotal attachment between the second end and the first frame in the second direction and a rotation of the second sortation table about the pivotal attachment between the second end and the second frame in the first direction is such that a first angle between the first frame and the first sortation table and a second angle between the second frame and the second sortation table decreases.

11. The sortation system according to claim 8, further comprising:

a first rotation mechanism operably coupled with the first sortation table and configured to cause a rotation of the first sortation table about the second end so as to perform the first tilt operation and/or the first bomb bay operation; and a second rotation mechanism operably coupled with the second sortation table and configured to cause a rotation of the second sortation table about the second end so as to perform the second tilt operation and/or the second bomb bay operation.

12. The sortation system according to claim 8, wherein the one or more first rollers are configured to translate the first article relative the first surface of the first body, wherein the one or more second rollers are configured to translate the first article and/or the second article relative the second surface of the second body.

13. The sortation system according to claim 8, wherein the second sortation table is configured to transfer the first article and/or the second article to a third chute via the second tilt operation.

14. A sortation system comprising:

a frame, a first sortation device that includes a first sortation table defining:

a first end of first sortation device;

a second end of first sortation device opposite the first end of first sortation device, wherein the first end of first sortation device is configured to pivotally attach the first sortation table to a first location of the frame; and a first body extending therebetween, the first body defining a first surface configured to support a first article thereon, one or more first rollers supported by the first body of the first sortation table, wherein the first sortation device is configured to perform:

a first tilt operation in which the first sortation table rotates about a pivotal attachment between the first end and the first location of the frame in a second direction; and a first bomb bay operation in which the first sortation table rotates about the pivotal attachment between the first end and the first location of the frame in a first direction opposite the second direction; and a second sortation device that includes a second sortation table defining:

a first end of the second sortation device;

a second end of the second sortation device opposite the first end of the second sortation device, wherein the first end of the second sortation device is configured to pivotally attach the second sortation table to the first location of the frame; and a second body extending therebetween, the second body defining a second surface configured to support the first article and/or a second article thereon, one or more second rollers supported by the second body of the second sortation table, wherein the second sortation device is configured to perform:

a second tilt operation in which the second sortation table rotates about the pivotal attachment between the first end and the first location of the frame in the first direction; and a second bomb bay operation in which the second sortation table rotates about the pivotal attachment between the second end and the first location of the frame in the second direction, wherein at least one of the one or more first rollers and the one or more second rollers is configured to position one of the first article or the second article in a central location partially supported by the first end of the first sortation device and partially supported by the first end of the second sortation device, wherein the one of the first article or the second article is positioned at the central location to transfer the one of the first article or the second article to a chute.

15. The sortation system according to claim 14, wherein rotation of the first sortation table about the pivotal attachment between the first end and the frame in the first direction and the rotation of the second sortation table about the pivotal attachment between the first end and the frame in the second direction is such that a first angle between the frame and the first sortation table and a second angle between the frame and the second sortation table decreases.

* * * * *